United States Patent [19]
Ogino et al.

[11] Patent Number: 5,699,330
[45] Date of Patent: Dec. 16, 1997

[54] MAGNETOOPTICAL DISC APPARATUS HAVING SINGLE MICRO-PROCESSOR FOR CONTROLLING INPUT/OUTPUT PROCESSING OF INFORMATION BY CAUSING AN INTERRUPTION IN THE PROCESSING

[75] Inventors: Tsukasa Ogino; Hisatoshi Baba, both of Yokohama; Hirotake Ando, Tokyo; Yoshihiro Saga, Kawasaki, all of Japan

[73] Assignee: Canon Kabushiki Kaisha, Tokyo, Japan

[21] Appl. No.: 321,616

[22] Filed: Oct. 12, 1994

[30] Foreign Application Priority Data

| Oct. 13, 1993 | [JP] | Japan | 5-255803 |
| Jul. 19, 1994 | [JP] | Japan | 6-166804 |
| Sep. 2, 1994 | [JP] | Japan | 6-209826 |
| Sep. 13, 1994 | [JP] | Japan | 6-218750 |
| Sep. 14, 1994 | [JP] | Japan | 6-219835 |
| Sep. 14, 1994 | [JP] | Japan | 6-219836 |

[51] Int. Cl.$^6$ .................................. G11B 17/22
[52] U.S. Cl. .................... 369/32; 369/48; 369/44.11
[58] Field of Search .................. 369/32, 44.11, 369/44.21, 44.27, 44.28, 43, 47, 58, 54, 111, 116, 48, 59, 49, 44.32

[56] References Cited

U.S. PATENT DOCUMENTS

| 4,942,563 | 7/1990 | Yamamuro | 369/44.11 |
| 4,972,395 | 11/1990 | Baba | 369/13 |
| 4,989,194 | 1/1991 | Aoi | 369/44.27 |
| 5,107,101 | 4/1992 | Ando | 250/201.5 |
| 5,243,585 | 9/1993 | Hoshino et al. | 369/44.41 |
| 5,260,923 | 11/1993 | Baba | 369/44.28 |
| 5,477,516 | 12/1995 | Takezawa | 369/32 X |

FOREIGN PATENT DOCUMENTS

| 0375342 | 6/1990 | European Pat. Off. . |
| 0395403 | 10/1990 | European Pat. Off. . |
| 0419027 | 3/1991 | European Pat. Off. . |
| 0458319 | 11/1991 | European Pat. Off. . |
| 0626687 | 11/1994 | European Pat. Off. . |

OTHER PUBLICATIONS

"Realtime Task Dispatcher for Multiloop Control System," IBM Technical Disclosure Bulletin, vol. 31, No. 6, Nov. 1988, pp. 446–453.

*Primary Examiner*—Ali Neyzari
*Attorney, Agent, or Firm*—Fitzpatrick, Cella, Harper & Scinto

[57] ABSTRACT

Input/output processing of information is controlled in a magnetooptical disc apparatus for recording and/or reproducing the information on a magnetooptical recording medium by irradiating a desired track of the recording medium with a light beam via an optical system. The servo control of the light beam such as tracking servo control, focusing servo control or the like is performed by causing interruption in the input/output processing control. When the apparatus activates, a parameter in the servo control is set on the basis of a reproduction signal amplitude of the information with a change in state of the servo control and a parameter in signal processing of the information is set in accordance with a reproduction signal amplitude of the information corresponding to the set parameter for the servo control.

8 Claims, 32 Drawing Sheets

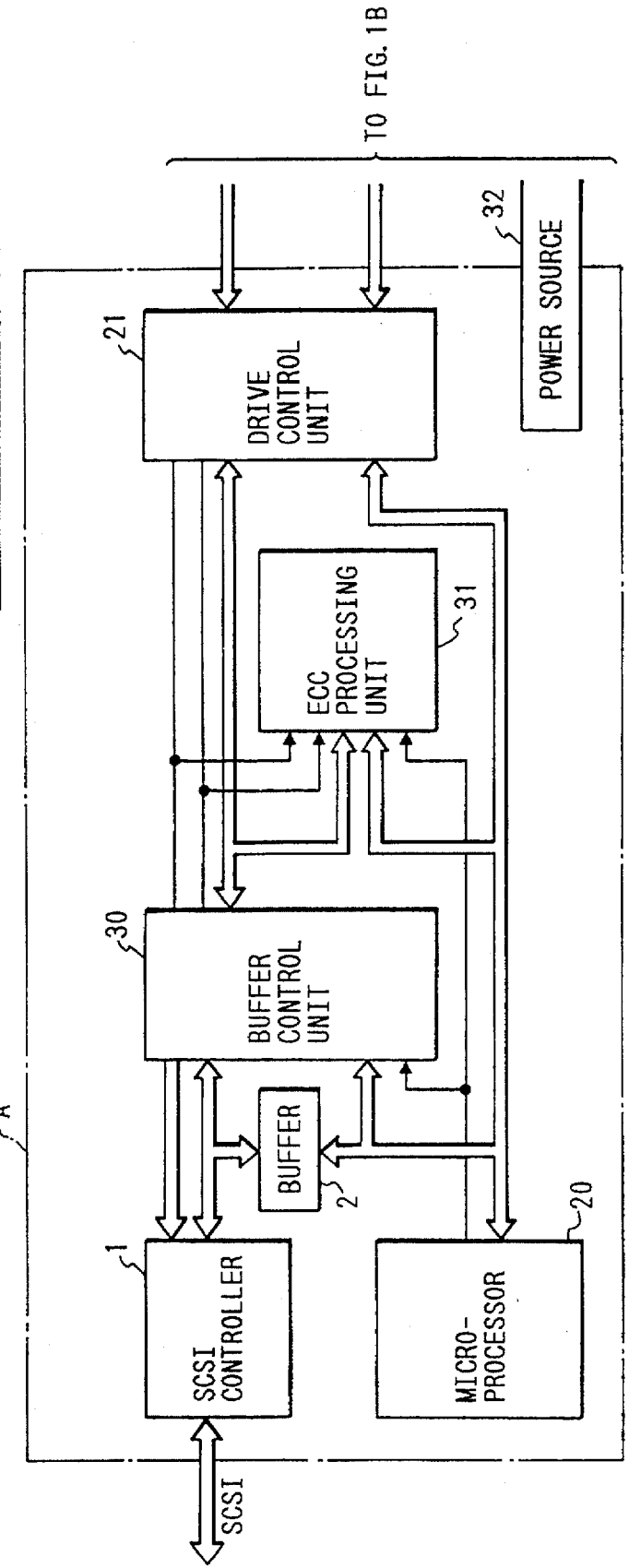

FIG. 15A CONVERSION START SIGNAL a

FIG. 15B BUSY SIGNAL b

FIG. 15C INTERRUPT SIGNAL c

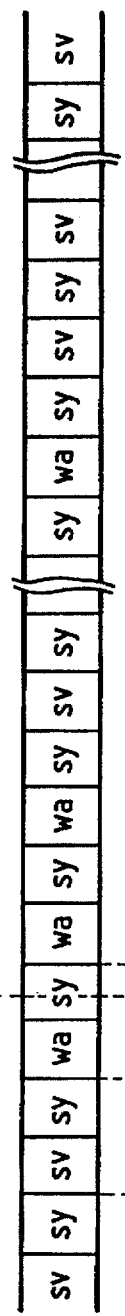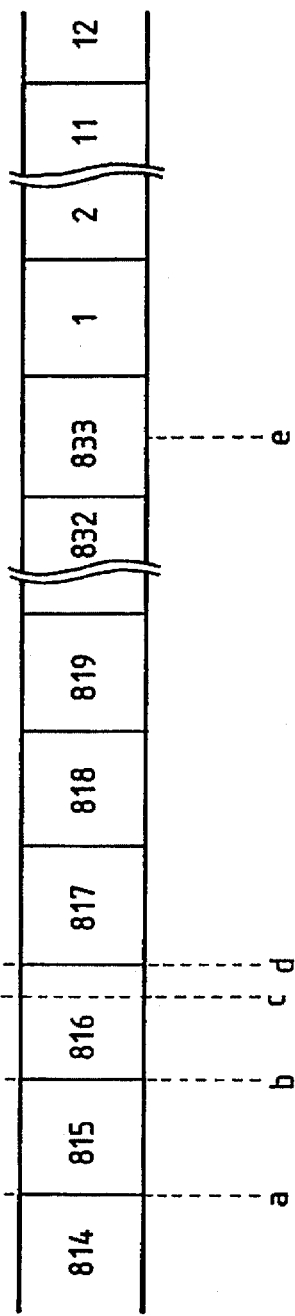
FIG. 30A OUTPUT OF PULSE GENERATING MEANS
FIG. 30B EXECUTION PROCESSING IN MICRO-PROCESSOR
FIG. 30C INTERRUPTION PROCESSING COUNT VALUE

MAGNETOOPTICAL DISC APPARATUS HAVING SINGLE MICRO-PROCESSOR FOR CONTROLLING INPUT/OUTPUT PROCESSING OF INFORMATION BY CAUSING AN INTERRUPTION IN THE PROCESSING

BACKGROUND OF THE INVENTION

1. Field of the Invention

The present invention relates to a magnetooptical disc apparatus for at least recording or reproducing information on or from a magnetooptical recording medium by irradiating a track of the recording medium with a light beam emitted from a light source and applying an external magnetic field.

2. Related Background Art

A conventional magnetooptical disc apparatus generally has an arrangement like the one shown in FIG. 1 ("Magnetooptical Disc Apparatus", Oki Denki Technical Report, 148, Vol. 57, No. 4). This disc apparatus comprises a drive unit, a control unit, and a power source. The drive unit is constituted by an optical head (an actuator 12 and an optical system 14 including a light source, a detector, an objective lens, and the like) for recording and/or reproducing information on/from a disc, a signal processing unit 15 for mainly performing modulation of externally transferred data in a recording operation and detection/demodulation of data read out from a disc, a servo control unit 22, a medium loading/ejecting mechanism 10, a disc rotating mechanism 9, and a first micro-processor 23 for controlling the drive unit. The control unit is constituted by a drive control unit 21 for controlling data transfer from/to the drive unit and the operation of the drive unit, an ECC processing unit 31 for performing error correction of data, a buffer control unit 30 for controlling a data buffer, an SCSI controller 1, and a second micro-processor 20.

In such a conventional magnetooptical disc apparatus, however, micro-processors are required for the drive unit and the control unit, respectively. In addition, although not shown in FIG. 1, the two processors respectively require memories for storing programs and variables. Such memories are also required for the drive unit and the control unit, respectively. Furthermore, the drive control unit 21 is required to smoothly control the control unit and the drive unit.

As described above, the conventional magnetooptical disc apparatus requires micro-processors, memories, and a drive control unit. Therefore, the disc apparatus is expensive and it is difficult to reduce it in size.

SUMMARY OF THE INVENTION

The present invention has been made in consideration of the above various problems, and has as its object to provide an inexpensive, compact magnetooptical disc apparatus which can sufficiently realize the conventional function with one micro-processor.

In order to achieve the above object, according to the present invention, there is provided a magnetooptical disc apparatus for recording and/or reproducing data on a magnetooptical recording medium by irradiating a desired track of the recording medium with a light beam emitted from a light source via an optical system, comprising means for controlling input/output processing of data with respect to the disc apparatus and performing servo control of the light beam by an interrupt operation in the input/output processing control.

According to the present invention, a servo control operation demanding real-time processing is executed by an interrupt operation during execution of a control operation, such as input/output processing of data, which need not be executed in real time, thereby sufficiently realizing the conventional function with one micro-processor.

BRIEF DESCRIPTION OF THE DRAWINGS

FIGS. 30A through 30C are timing charts for explaining a wait jump timing in the sixth embodiment;

DETAILED DESCRIPTION OF THE PREFERRED EMBODIMENTS

[First Embodiment]

Figure 1B:
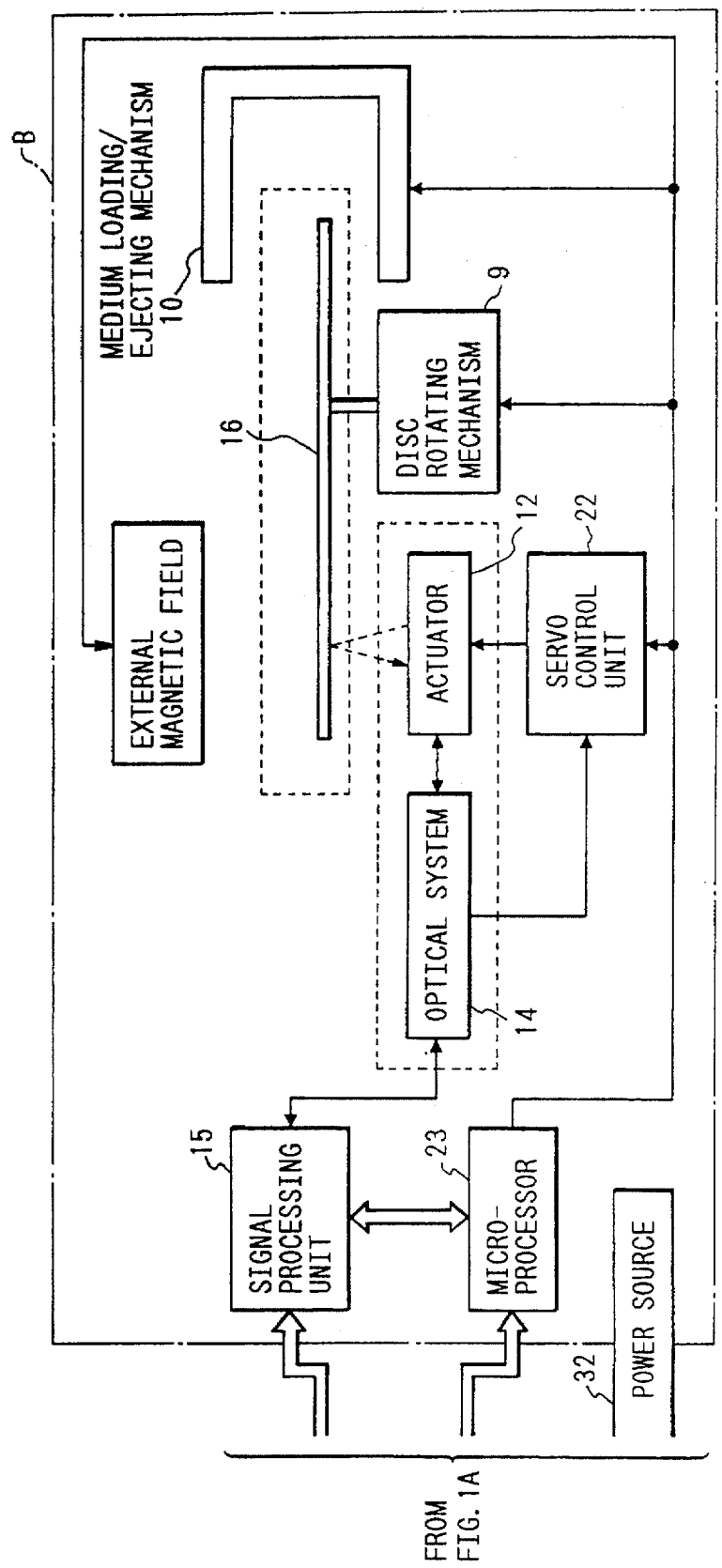
FIG. 1 is a block diagram comprised of FIG. 1A and FIG. 1B showing block diagrams for the arrangement of a conventional magnetooptical disc apparatus.
Figure 2:
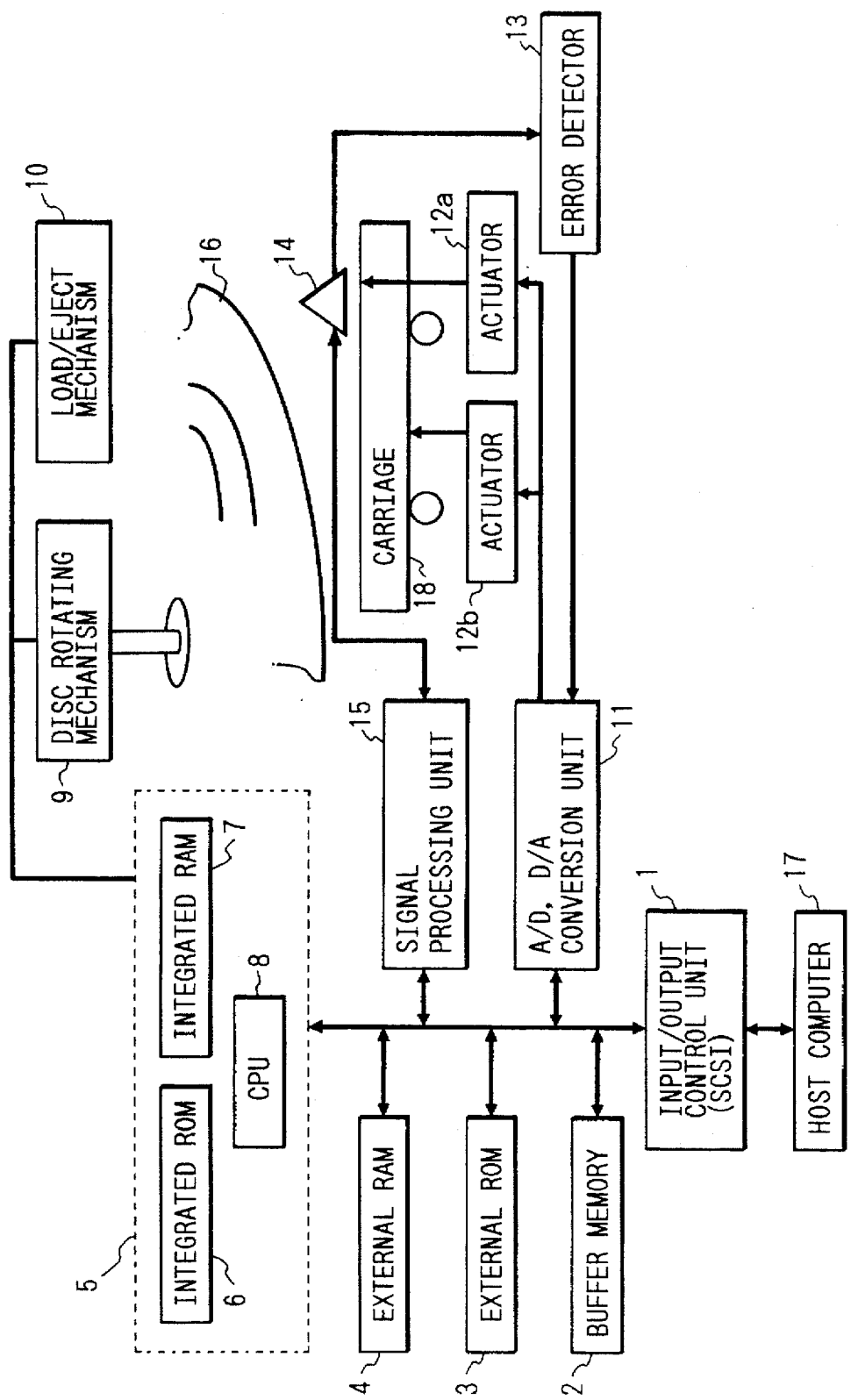
FIG. 2 is a block diagram showing a magnetooptical disc apparatus according to the first embodiment of the present invention.

The first embodiment of the present invention will be described in detail below with reference to the accompanying drawings. FIG. 2 is a block diagram showing a magnetooptical disc apparatus according to the present invention. Note that the same reference numerals in FIG. 2 denote the same parts as in FIGS. 1A and 1B showing the conventional disc apparatus. That is, a buffer memory 2, a disc rotating mechanism 9, an optical system 14, a signal processing unit 15, and a magnetooptical disc 16 are the same as those shown in FIGS. 1A and 1B. In addition, an input/output conrol unit 1 and a load/eject mechanism 10 respectively correspond to the SCSI controller 1 and the medium loading/ejecting mechanism 10 in FIGS. 1A and 1B.

A micro-processor 5 is a processor solely arranged in the disc apparatus. The micro-processor 5 is constituted by one CPU 8 and internal memories, i.e., an integrated ROM 6 and an integrated RAM 7, which are mounted on the same chip on which the CPU 8 is mounted. In addition to these internal memories, the disc apparatus includes an external ROM 3 and an external RAM 4 for storing programs and variables. An error detector 13 detects position errors of the optical head, i.e., a focusing error and a tracking error, on the basis of detection signals from an optical sensor arranged in the optical system 14. The obtained error signals are converted into digital values by an A/D and D/A conversion unit 11 and supplied to the micro-processor 5. An actuator 12a is constituted by a tracking actuator for moving the objective lens in the optical system 14 in the tracking direction, and a focusing actuator for moving the objective lens in the focusing direction. An actuator 12b is a linear motor for driving a carriage 18 to move the optical head in a direction to cross tracks.

The optical head is obtained by integrating the optical system 14 with the actuator 12a. The optical head is driven by the actuator (linear motor) 12b to move in the radial direction so as to access a desired track. In this embodiment, the functions of the servo control unit 22 in FIGS. 1A and 1B are realized by the micro-processor 5, the A/D and D/A conversion unit 11, and the error detector 13. That is, in this embodiment, servo control is constituted by digital servo control. The micro-processor 5 performs predetermined arithmetic processing on the basis of an error signal detected by the error detector 13, and outputs the processing result to the actuator 12a via the A/D and D/A conversion unit 11, thereby performing tracking servo and focusing servo. A host computer 17 is a unit for issuing a command to record/reproduce or the like to the magnetooptical disc apparatus. The magnetooptical disc apparatus is connected, as an external memory unit, to the host computer 17. The input/output control unit 1 receives a command from the host computer 17 and sends it to the micro-processor 5.

The micro-processor 5 is the main control unit of the magnetooptical disc apparatus of this embodiment. The micro-processor 5 performs control to temporarily store recording data, transferred from the host computer 17, in the buffer memory 2 or supply the recording data from the buffer memory 2 to the signal processing unit 15. The micro-processor 5 also controls an input/output operation (also referred to as a recording/reproducing operation in this case) to transfer reproduction data, read out from the magnetooptical disc 16 by the optical head, to the host computer 17. In addition, the micro-processor 5 performs a position control operation (including a tracking/focusing operation) for a light beam, as described above, and velocity control in seek control of the optical head by controlling the actuator 12b. Note that a buffer control unit 30, an ECC processing unit 31, and a power source 32 are not shown in FIG. 2.

Figure 3:
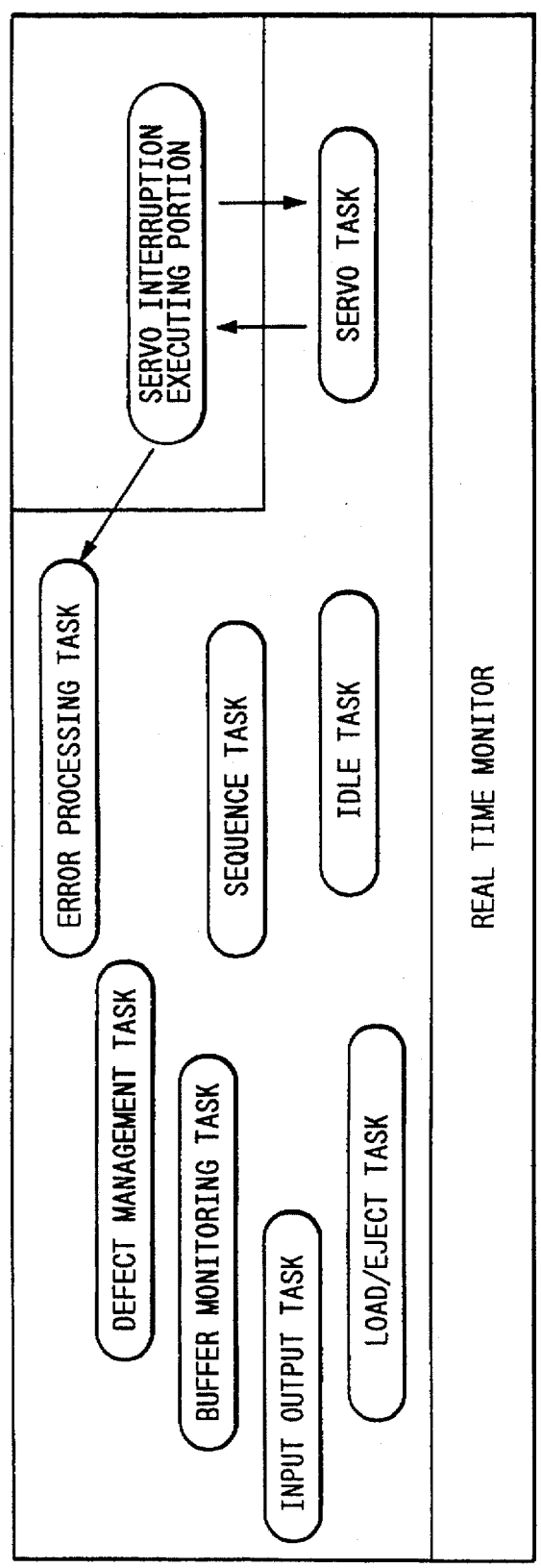
FIG. 3 is a schematic diagram showing a program configuration in a micro-processor 5 in the first embodiment.

FIG. 3 is a diagram which shows a program configuration in the micro-processor 5. This configuration is a task management type configuration based on a real time monitor (synonymous with a real time OS). When, for example, a recording command is issued from the host computer 17 to the input/output control unit 1, a sequence task for managing tasks in a task portion is assigned a high priority of execution (designated by an event) in an input output task in FIG. 3, and activates the input output task at the same time. In the input output task, a command is received by the input/output control unit 1 and interpreted. At this time, other tasks are set in a standby or stopped state. In this case, servo control such as focusing/tracking control is time-divisionally performed in parallel by interruption processing. When input/output processing of the command is completed, the sequence task lowers the priority of the input output task and activates another task having a high priority. In this embodiment, control of data to be recorded/reproduced, load/eject control, error processing of the magnetooptical disc apparatus, and the like are executed by task management. Control operations demanding real time processing, such as tracking control, focusing control, and seek control of the optical head, are apparently executed in parallel with task execution according to a time-divisional processing form (interruption processing).

Figure 4:
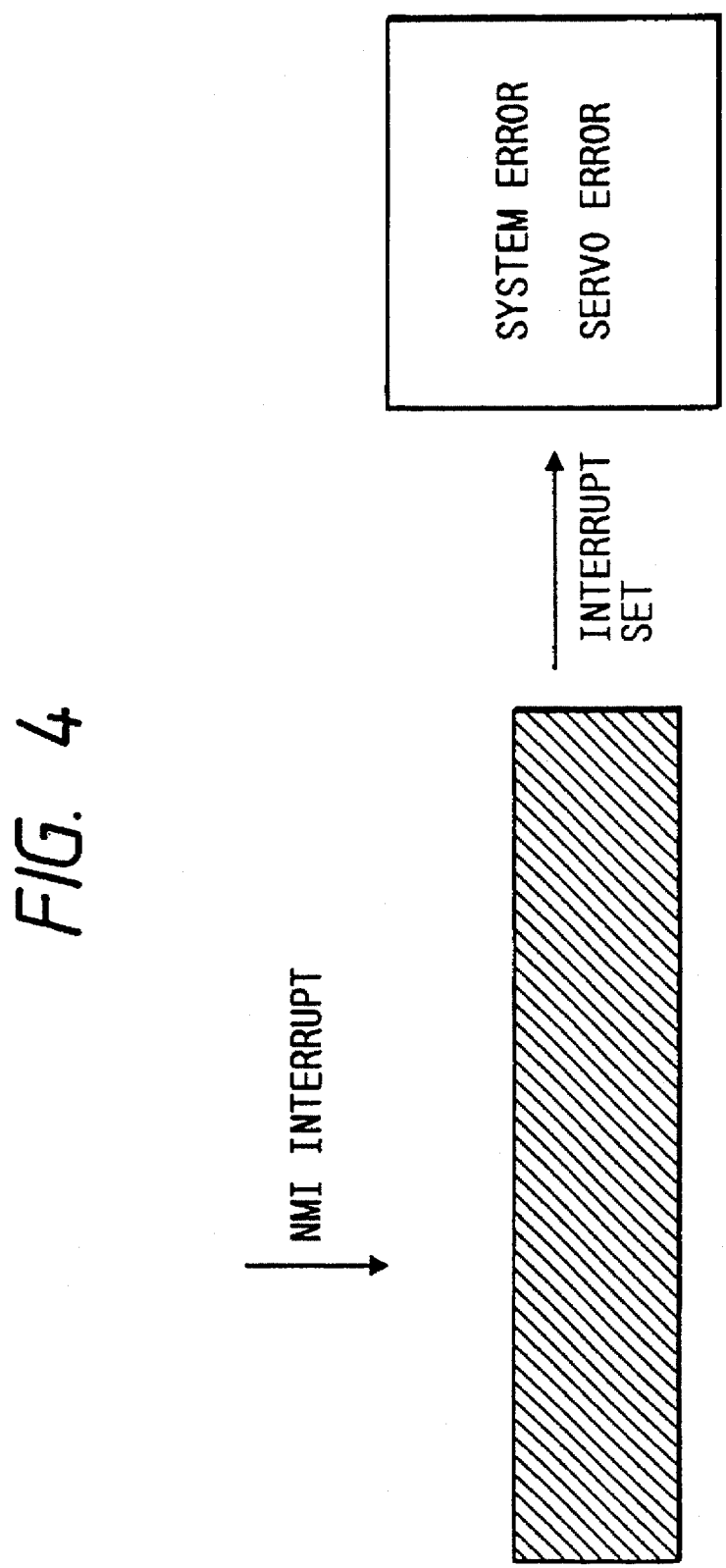
FIG. 4 is a schematic diagram showing the arrangement of an interruption processing portion in the first embodiment.

FIG. 4 is a diagram which shows the arrangement of an interruption processing portion for performing the above interruption processing. In this embodiment, a servo interrupt processing execution portion is called at a predetermined period by NMI (non-maskable interrupt) interrupt. When a predetermined operation is completed, an end status is stored in an internal memory, and a status interruption is set, thereby completing the processing. When an error (e.g., a servo error or an abnormal increase in temperature in the disc apparatus) occurs during the execution of servo interruption processing, error information is set on the internal memory as in the above operation, and status interruption is set, thereby completing the processing. In response to this status interruption command, a task portion higher in order than the interrupt processing execution portion activates a corresponding task. If, for example, seek control, which has been executed in the interrupt processing execution portion, is properly completed, the servo task shown in FIG. 3 is activated in the task portion to load an end status. The task ends after analysis. When an error occurs, an error processing task is activated to load a status, and recovery processing is performed in accordance with the condition of the status.

Servo processing executed by the interruption processing portion is executed in real time at a predetermined period. For example, in focusing control, a command value for the actuator 12a is calculated by using an error signal sampled at a predetermined period. For this reason, processing is always performed at a predetermined period and is forcibly executed by interruption control during the execution of a task, as described above. A processing operation during this interruption control must be executed at high speed to prevent adverse effects on the execution of a task. In this embodiment, all the programs for servo control processing executed by the interruption processing portion are stored in the integrated ROM 6 mounted on the same chip on which the CPU 8 is mounted. In addition, as a variable area required for servo processing, the integrated RAM 7 which allows high-speed processing is used.

As a stack area, the integrated RAM 7 is used. The stack area is used when processing is executed by the interruption processing portion during the execution of a task. The stack area will be briefly described below. During execution of a task processing, when processing in the CPU is shifted from the task processing to the interruption processing portion by interruption, as shown in FIG. 4, the state (e.g., a register, a variable, and a program counter) of currently executed task processing must be temporarily saved. An area used for this saving operation is the stack area. This stacked state is read out when the CPU is restored to the previous state after the interruption processing, is completed. That is, every time interruption processing occurs, a write/read operation with respect to the memory is performed, thus wasting the time required for this processing. In this embodiment, in order to shorten this time, the integrated RAM is used as the stack area. Note that the operating speeds of the external ROM 3 and the external RAM 4 are not lower than those of the integrated ROM 6 and the integrated RAM 7. However, the differences in speed between the external memories and the integrated memories are based on different access methods employed by the CPU 8. That is, the memories mounted on the same chip on which the CPU 8 is mounted can be more easily and quickly accessed than the external memories.

Figure 5:
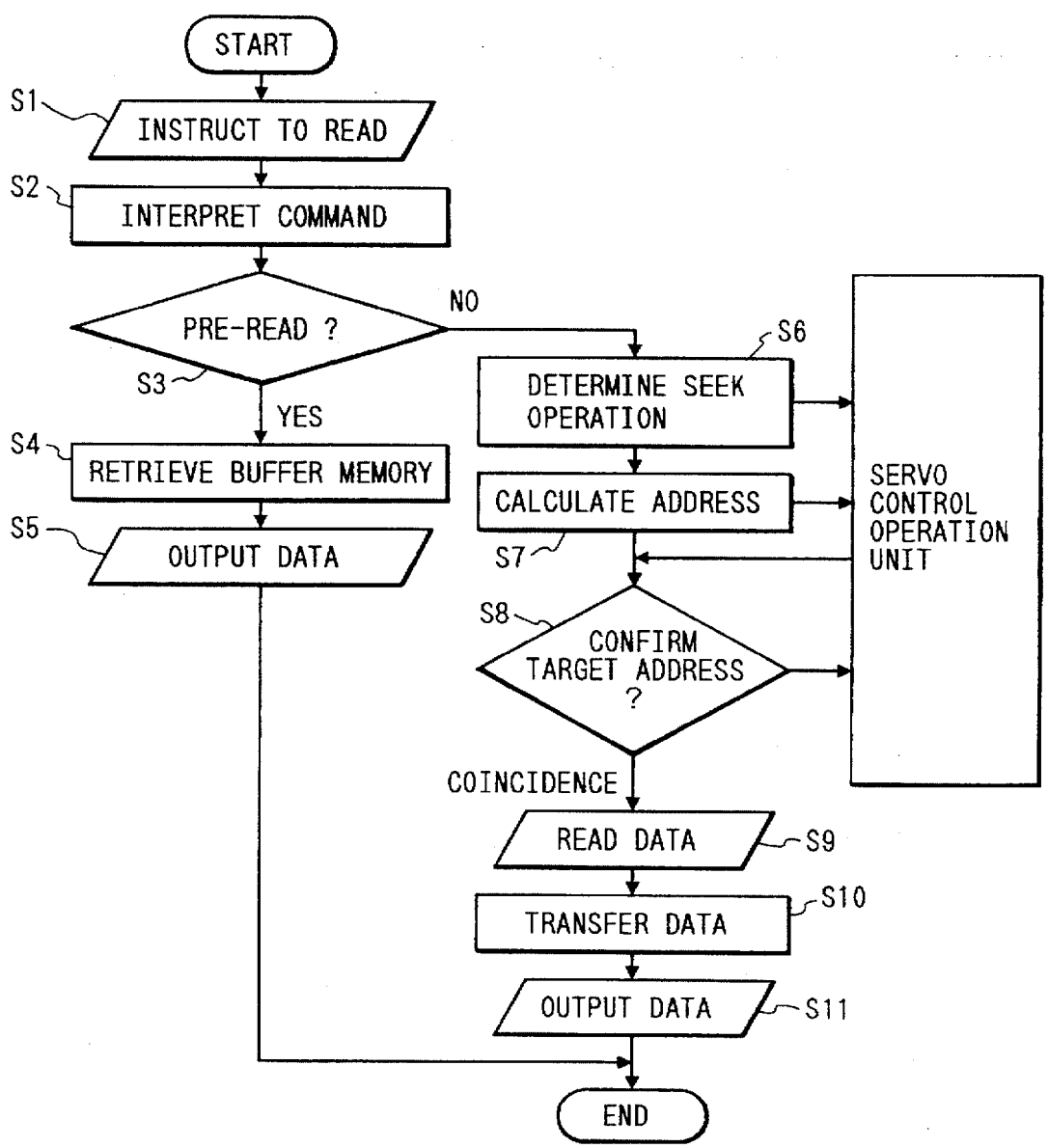
FIG. 5 is a flow chart showing the operation of a task portion during reproduction of data in the first embodiment.

The operation of this embodiment will be described in detail next. FIG. 5 is a flow chart showing a control operation to be performed in a read operation of the magnetooptical disc apparatus. This operation will be described with reference to the block diagram in FIG. 2 and the program configuration in FIG. 3 as well. Referring to FIG. 5, first of all, a data read command from the host computer 17 is read by the input/output control unit 1 (step S1). An input/output task is then activated and executed, as described above. That is, the command is interpreted by the CPU 8 in the micro-processor 5 (step S2). The input/output task is stopped, and a buffer monitoring task for performing a reproducing operation is activated by a sequence task. When the buffer monitoring task is activated, it is checked whether a pre-read has been performed (step S3). That is, it is checked whether target data is present in the buffer memory 2. If target data is present in the buffer memory 2, the data is retrieved from the buffer memory 2 (step S4) and output to the host computer 17 via the input/output control unit 1 (step S5). In this case, the buffer monitoring task and the input output task are sequentially activated by the sequence task.

If NO in step S3, a seek operation is determined in the buffer monitoring task, and at the same time, the corresponding command is output to the interruption processing portion. The interruption processing portion then switches the current operation mode to the seek operation mode in response to the command (step S6). Note that even while the above processing is executed, the interruption processing portion executes a servo control operation, and time-divisionally executes the operation shown in the flow chart in FIG. 8. The executed state of task processing before the execution of the servo control operation is saved in the integrated RAM 7. After this saving operation, the servo control operation is performed. Upon completion of the servo control operation, task processing is executed again from the state before the interruption. In this embodiment, this time-divisional processing is performed at intervals of 20 [μsec]. The operation of the interruption processing portion in this case will be described in detail later. Although the current operation mode of the interruption processing portion has been switched to the seek operation mode, an address is calculated by the buffer monitoring task in the task portion (step S7).

This address calculation includes a primary address calculating operation in which the CPU 8 simply and approximately calculates a direction and a distance in/by which the optical head is to move on the basis of a target address, and a secondary address calculating operation in which a physical address is accurately calculated from a logical address to obtain a distance by which the optical head is to move. After the primary address calculation, the resultant information is supplied to a servo control operation unit. Upon reception of this result, the interruption processing portion of the CPU 8 sends an actuator drive signal to the A/D and D/A conversion unit 11. The A/D and D/A conversion unit 11 converts the digital signal into an analog signal and sends it to the actuator 12a or 12b. If the moving distance is small, the CPU 8 outputs a command to the actuator 12a. If the moving distance is large, the CPU 8 outputs a command to the actuator 12b. When the secondary address is obtained by the address calculation in step S7, a seek operation is executed by a precise velocity control operation. In this case, the servo task is set in a standby state. That is, in the task portion, another task having a high priority is executed until a seek end status interruption is generated by the interruption processing portion. For example, a defect management task or the buffer monitoring task is executed.

Figure 6:
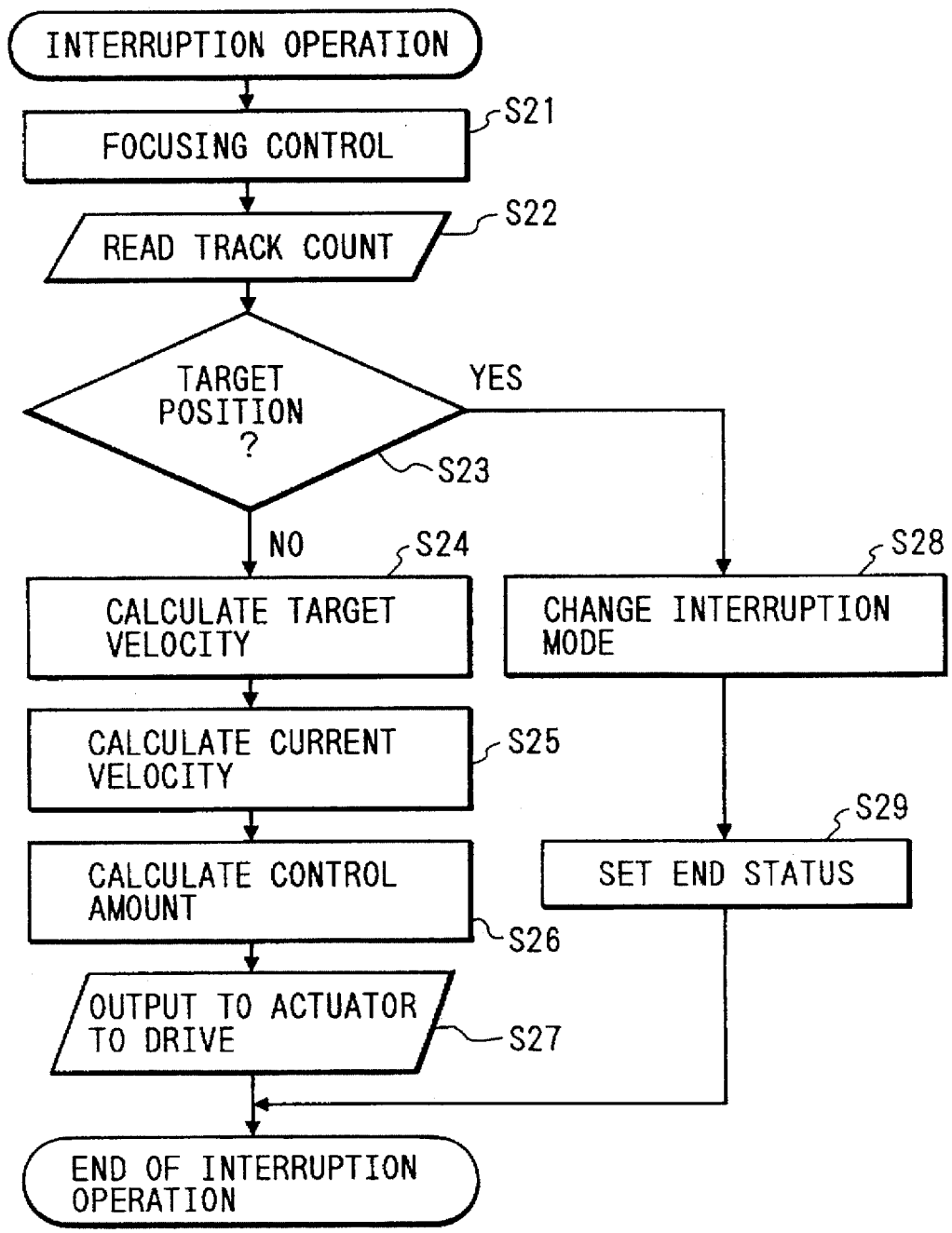
FIG. 6 is a flow chart showing the operation of the interruption processing portion in a seek operation in the first embodiment.

The operation of the interruption processing portion for performing seek control will be described in detail below with reference to the flow chart in FIG. 6. As described above, in this embodiment, a time-divisional operation is executed at intervals of 20 [μsec]. When an interruption is generated, a focusing control operation is performed first (step S21). In this case, a focusing error signal obtained by the error detector 13 is converted into a digital signal by the A/D and D/A conversion unit 11. The digital signal is then loaded into the micro-processor 5. The CPU 8 calculates a focusing control signal on the basis of the digital signal by using a predetermined arithmetic expression in the integrated ROM 6 and predetermined parameters in the integrated RAM 7, and outputs a drive signal to the actuator 12a via the A/D and D/A conversion unit 11. Subsequently, a track count value is read (step S22). This track count value is obtained from a tracking error signal obtained by the error detector 13. More specifically, a tracking error signal is converted into a pulse-like signal by a binarization circuit (not shown) to be counted by a counter (not shown). Note that this counter may be incorporated in the micro-processor 5.

Figure 8:
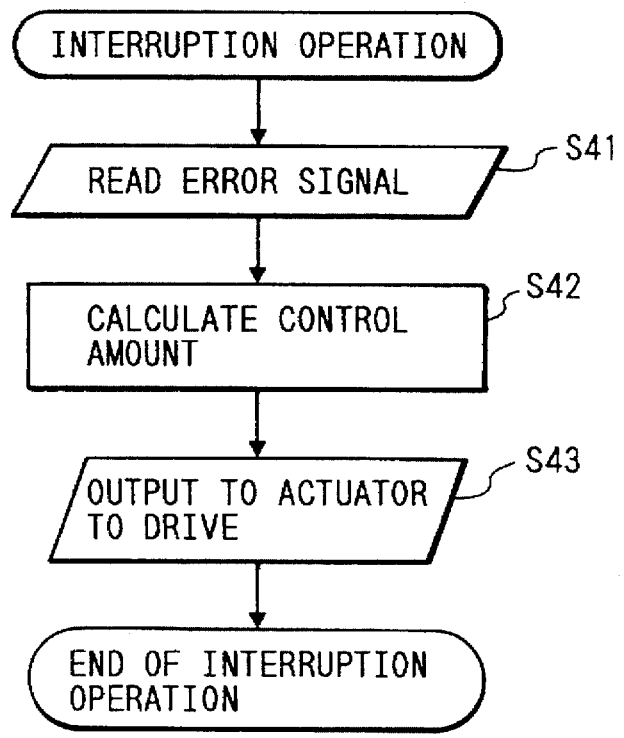
FIG. 8 is a flow chart showing the operation of the interruption processing portion in a track tracing operation in the first embodiment.

This track count value is compared with a target track count value (step S23). If they coincide with each other, i.e., the optical head has reached the target position, the interruption mode is changed (step S28), and a seek end status is stored in the integrated RAM 7 (step S29). Thereafter, the processing ends. In this embodiment, this interruption mode is changed to the track tracing mode, and the interruption processing shown in FIG. 8 is executed afterward. If NO in step S23, a target velocity $V_{ref}$ is calculated from the current track count value (step S24), and a current velocity $V_n$ is calculated (step S25). A velocity control scheme executed in the embodiment will be described later. A seek control amount is calculated on the basis of the respective calculated values according to an arithmetic expression stored in the integrated ROM 6 (step S26). The obtained control amount is output to the actuator 12b via the A/D and D/A conversion unit 11 (step S27). In this case, if the moving distance is small, a command is output from the CPU 8 to the actuator 12a. If the moving distance is large, a command is output from the CPU 8 to the actuator 12b. When the above operation is completed, the interruption processing portion ends the operation. Control is then passed to the task portion. In the task portion, the operation which has been executed when the interruption processing was started is executed. When an interruption occurs afterward, the interruption processing in steps S21 to S27 is executed.

When the seek operation is completed in step S29, and a status interruption occurs, the servo task which has been set in a standby state is activated to execute a target address confirming operation in step S8 in FIG. 5. In step S8, the signal processing unit 15 detects an address from a signal read from the magnetooptical disc 16 by the optical head, and the micro-processor 5 checks whether the detected address coincides with a target address. If they coincide with each other, the servo task ends, and the buffer monitoring task is activated to start reading data (step S9). If they do not coincide with each other, a seek operation is executed again. The data detected by the signal processing unit 15 from the signal read from the magnetooptical disc 16 by the optical head is transferred to the buffer memory 2 by the buffer monitoring task (step S10). At the same time, the data is output to the input/output control unit 1 (step S11). When predetermined data is transferred, the read operation is completed, and an idle task is activated.

Figure 7:
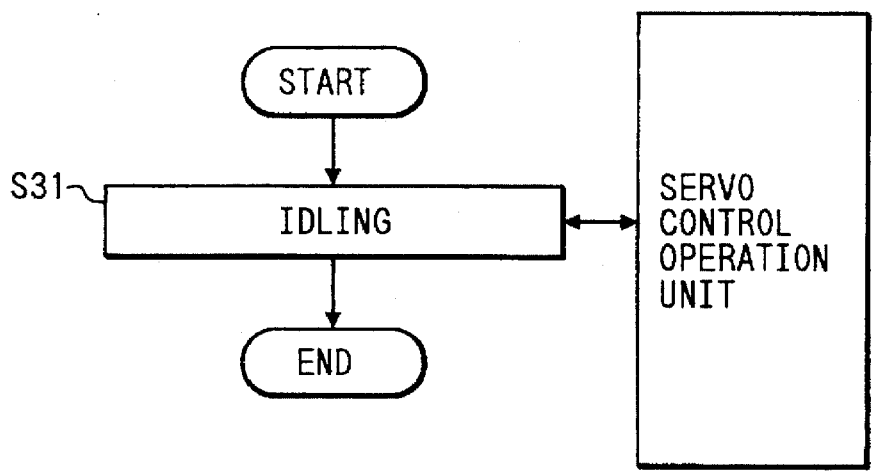
FIG. 7 is a flow chart showing the operation of the task portion in an idle period in the first embodiment.

FIG. 7 is a flow chart showing the operation of the idle task. Tasks other than the interruption processing portion are set in an idle state (step S31). At this time, the interruption processing portion is executing a track tracing operation. The flow chart of this operation is shown in FIG. 8.

Referring to FIG. 8, when an interrupt command is input, a focusing error signal and a tracking error signal obtained by the error detector 13 are converted into digital signals by the A/D and D/A conversion unit 11 and loaded into the micro-processor 5 (step S41). The micro-processor 5 calculates a focusing control signal and a tracking control signal on the basis of the digital signals by using predetermined arithmetic expressions in the integrated ROM 6 and predetermined parameters in the integrated RAM 7 (step S42). The micro-processor 5 then outputs a drive signal to the actuator 12a via the A/D and D/A conversion unit 11 (step S43). In this embodiment, in performing focusing control and tracking control, a tracking operation is performed first, and a focusing operation is then performed.

Figure 9A:
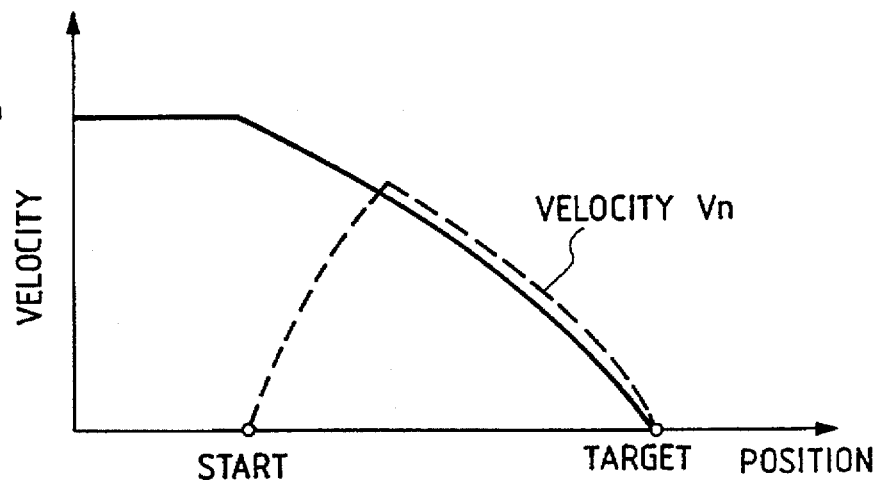
FIGS. 9A and 9B are graphs for explaining the first example of a velocity control scheme in the first embodiment.
Figure 9B:
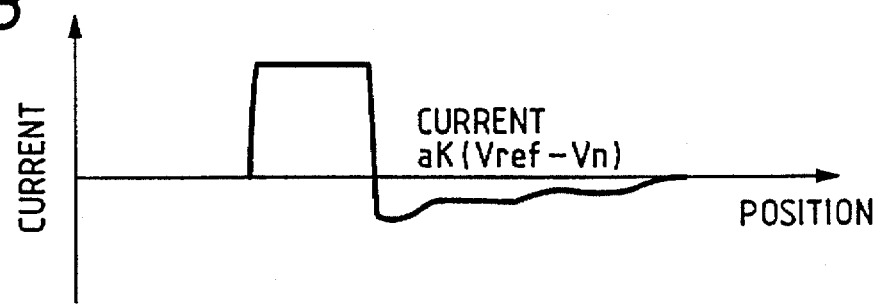

Velocity control in the seek operation of the optical head will be described next. As a control scheme for moving the optical head to a target position on the magnetooptical disc 16, a velocity control scheme is generally employed. As this velocity control scheme, a scheme of sequentially monitoring the velocity of the optical head and seeking it in accordance with a predetermined operation schedule is generally used. FIG. 9 shows the relationship between the reference velocity, the actual velocity, and the current applied to the actuator 12b for driving the carriage in the general velocity control scheme. Referring to FIGS. 9A and 9B, a target velocity curve ($V_{ref}$) indicates the velocity of the optical head according to the operation schedule, which is calculated in accordance with the remaining distance to a target position. The target velocity $V_{ref}$ is obtained by the following equation:

$$V_{ref}=(2\cdot\alpha(S-\lambda/2\cdot N))^{1/2} \quad (1)$$

where S is the target moving distance, λ is the track pitch, α is the deceleration, and N is the zero-crossing count value.

In order to cause the optical head to attain this target velocity, the current velocity of the optical head is sequentially detected. In this case, a current velocity $V_n$ of the optical head is detected by different schemes in high- and low-speed regions. In the high-speed region, a track count scheme is used, in which the current velocity $V_n$ is obtained from a track count N indicating the number of tracks which the optical head crosses within a predetermined sampling interval $T_s$.

$$V_n=(\lambda/2\cdot N)/T_s \quad (2)$$

In the low-speed region, a track interval count scheme is used, in which a zero-crossing point of a tracking error signal is detected, and a time $T_d$ between this zero-crossing point and the next zero-crossing point is measured. In this case, since the distance between the zero-crossing points is ½ the track pitch λ, the velocity can be obtained by the following equation (3):

$$V_n=(\lambda/2)/T_d \quad (3)$$

In selecting one of the velocity detection schemes, the scheme for the high-speed region is selected when the current velocity is higher than a predetermined velocity, whereas the scheme for the low-speed region is selected when the current velocity is lower than the predetermined velocity. The velocity of the optical head is controlled on the basis of a command value for the actuator which is calculated from the current velocity and the corresponding target velocity at a predetermined period. In this manner, the velocity of the optical head relative to a disc is sequentially detected by such velocity detection schemes using a track count and a tracking error signal, and the optical head is sequentially controlled in accordance with the target velocity calculated by equation (1). Especially, the target velocity $V_{ref}$ shown in FIG. 9 is stored, as a target velocity table, in the integrated ROM in the disc apparatus based on digital servo control according to this embodiment. In this target velocity table, a velocity value obtained by equation (1) with respect to a remaining distance (remaining tracks) is stored. In the embodiment, the optical head is sought to a target position by the above velocity control scheme in accordance with a predetermined operation schedule.

[Second Embodiment]

Figure 10:
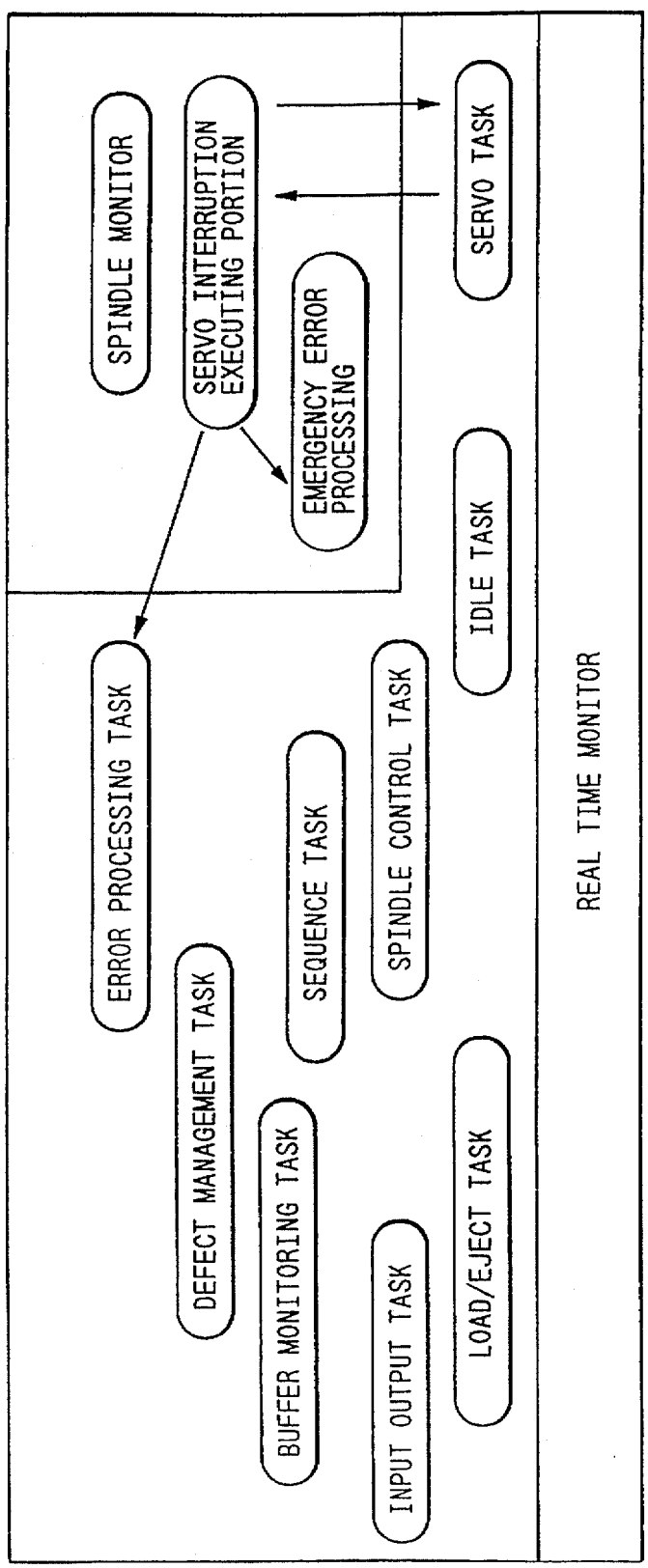
FIG. 10 is a schematic diagram showing a program configuration in a micro-processor 5 in the second embodiment of the present invention.

The second embodiment of the present invention will be described next. Since the arrangement of the disc apparatus of this embodiment is the same as that of the disc apparatus of the first embodiment, a description thereof will be omitted. FIG. 10 is a diagram which shows a program configuration in the second embodiment. Similar to the first embodiment, this program configuration is a task management type configuration based on a real time monitor (synonymous with a real time OS). In the embodiment, operations in an interruption processing portion include spindle monitor processing and emergency error processing in addition to the servo control operation in the above embodiment. In this embodiment, processing which is required to be executed in real time is executed by interruption processing, whereas processing which is allowed to be executed at a relatively low speed is executed in a task portion according to task management, thereby realizing a flexible program configuration.

Figure 11:
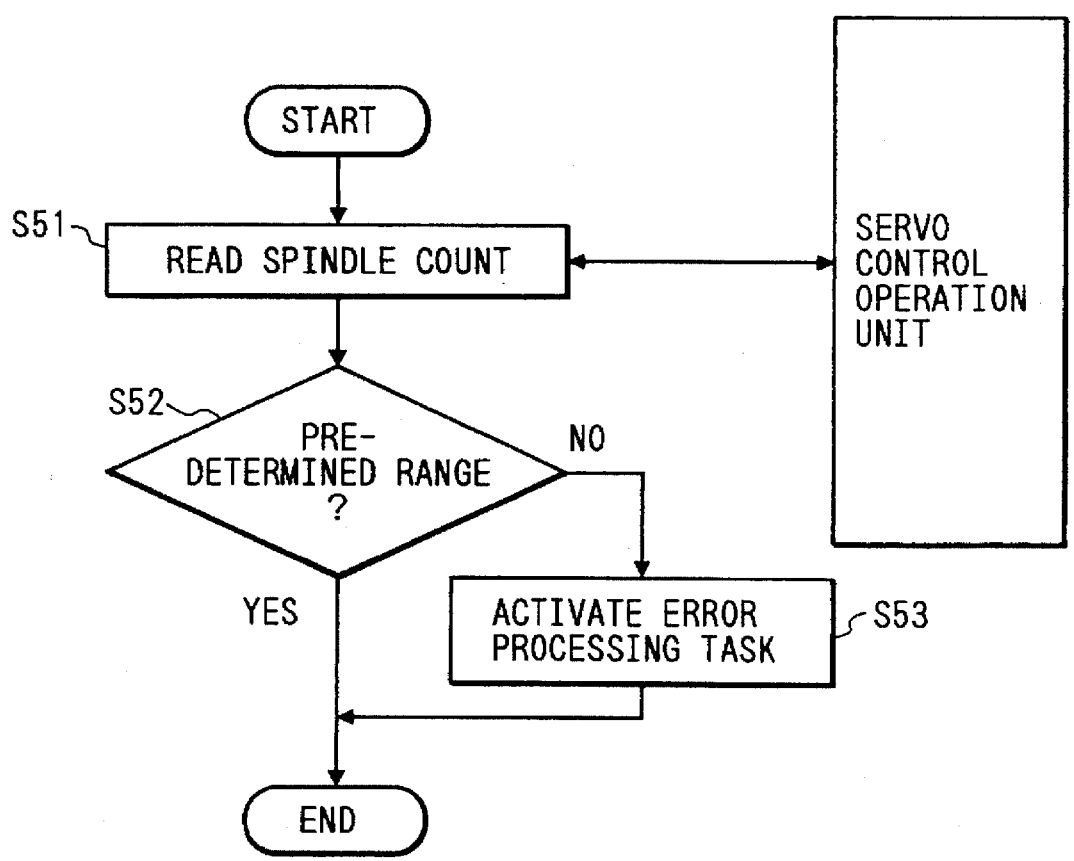
FIG. 11 is a flow chart showing the operation of a task portion in a spindle control operation in the second embodiment.
Figure 12:
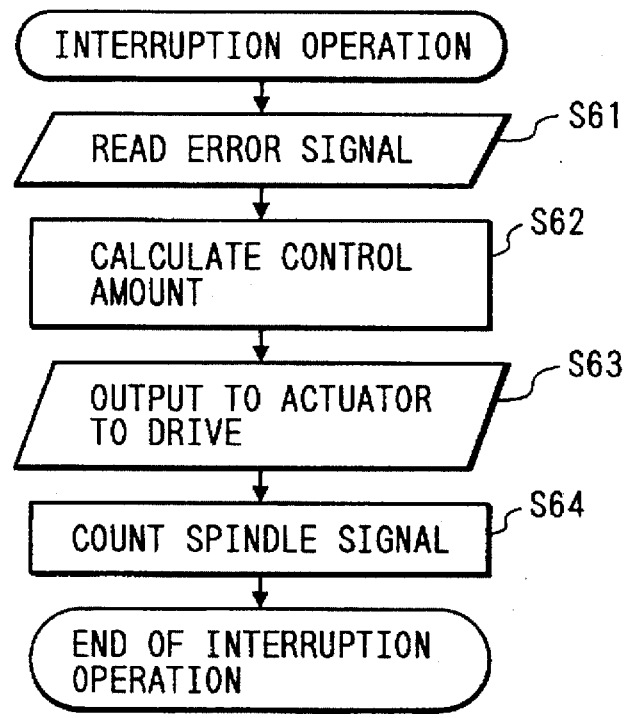
FIG. 12 is a flow chart showing the operation of an interruption processing portion in a track tracing operation and a spindle monitoring operation in the second embodiment.

The operation of this embodiment will be described in detail below with reference to the flow charts in FIGS. 11 and 12. FIG. 11 shows the operation of a spindle control task. FIG. 12 shows a spindle monitor operation in the interruption processing portion. In the flow chart shown in FIG. 12, a track tracing operation is performed (steps S61 to S63) in the same manner as described with reference to FIG. 8. The time taken for one revolution of the spindle is counted on the basis of spindle revolution signals (six signals per revolution) output from a disc rotating mechanism 9 (step S64), and the interruption processing is completed. Such a series of operations is executed for every interruption.

Since this spindle control task must be executed at a predetermined period, a program for the execution of this task is stored in an integrated ROM 6. Since the counted value at this time is required to be read/written at a high speed, the value is stored in an integrated RAM 7. The integrated RAM 7 is used as a stack area used when processing in the interruption processing portion is executed during the execution of a task. The executed state of task processing before the execution of a servo control operation is saved in the integrated RAM 7. Thereafter, a spindle control operation is performed. Upon completion of the spindle control operation, the state before the interruption is read out from the integrated RAM 7, and the state before the execution of the interruption processing is restored. Subsequently, the task processing is executed again.

Figure 13:
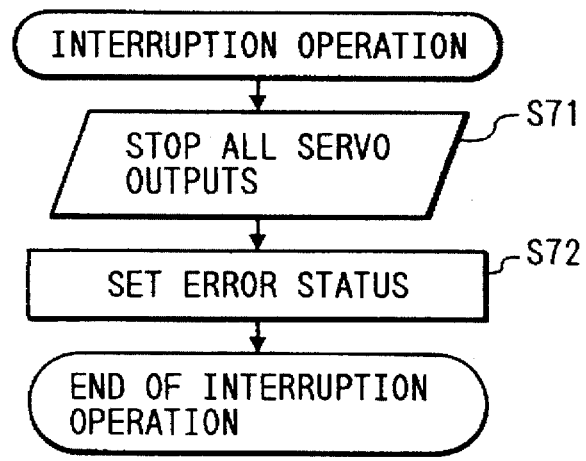
FIG. 13 is a flow chart showing the operation of the interruption processing portion in emergency error processing in the second embodiment.

In the task portion, as shown in FIG. 11, a spindle count value indicating the time taken for one revolution of the spindle is read (step S51). It is then checked whether the spindle count value falls within a predetermined range (step S52). If the spindle count value falls within the predetermined range, the processing ends. Otherwise, an error processing task is activated (step S53). As described above, the operation of accurately measuring a time interval must be executed at a predetermined period by interruption processing. For this reason, an interrupt operation must be reliably and quickly executed by storing the corresponding program in the integrated ROM 6. The emergency error processing shown in FIG. 10 is also processing to be executed by interruption processing. FIG. 13 is a flow chart showing this processing. When focusing servo control fails or trips by external vibrations or flaws on a disc while the track tracing operation shown in FIG. 8 is performed, all servo operations must be immediately stopped. In such a case, the operation in step S71 is executed by interruption processing, and interruption processing like setting of an error status (step S72) is executed.

[Third Embodiment]

Figure 14:
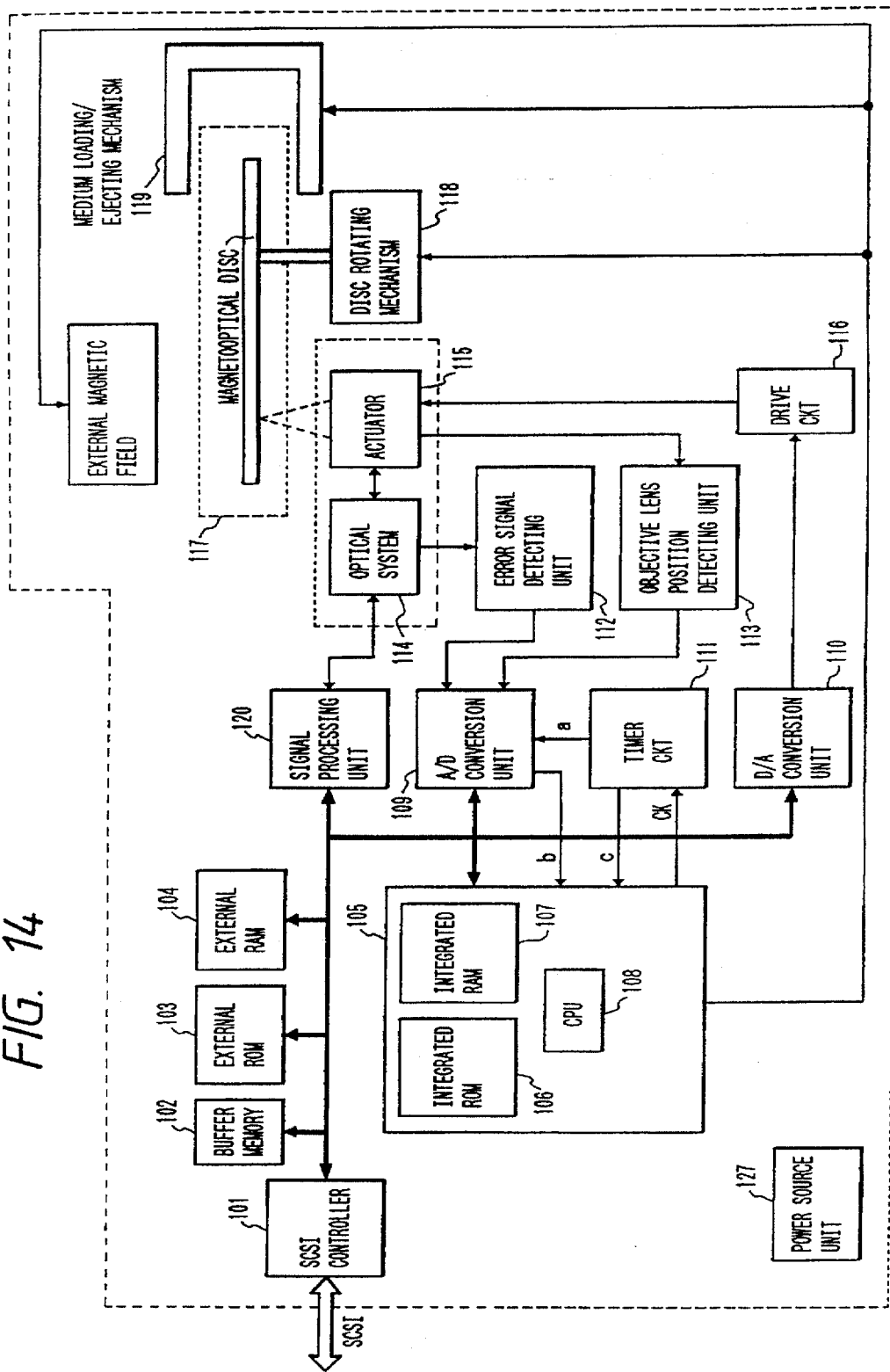
FIG. 14 is a block diagram showing the arrangement of a magnetooptical disc apparatus according to the third embodiment of the present invention.

The third embodiment will be described next with reference to the accompanying drawings. FIG. 14 shows the arrangement of a magnetooptical disc apparatus according to the third embodiment. Referring to FIG. 14, a microprocessor 105 is constituted by an integrated ROM 106, an integrated RAM 107, and a CPU 108. Only this microprocessor 105 is mounted, as a processor, in the disc apparatus.

The micro-processor 105 is connected to an SCSI controller 101, a buffer memory 102, an external ROM 103, an external RAM 104, a signal processing unit 120, and the like via a bus. In an information recording operation, the microprocessor 105 controls transfer of recording data sent from a host computer (not shown). In an information reproducing operation, the micro-processor 105 controls transfer of reproduction data generated by the signal processing unit 120, and performs error correction processing of the reproduction data obtained by the signal processing unit 120. The micro-processor 105 is also connected to an external magnetic field, a medium loading/ejecting mechanism 119, a disc rotating mechanism 118, and the like. Generation of an external magnetic field, loading/ejection of a magnetooptical disc 117, and rotation of the magnetooptical disc 117 are also controlled by the micro-processor 105. In addition, the micro-processor 105 is connected to a drive circuit 116 via a D/A conversion unit 110. The micro-processor 105 performs access control to drive a linear motor (not shown) through the drive circuit 116 so as to cause an optical head to access a desired track. As described above, the microprocessor 105 performs various system control operations.

The micro-processor 105 is connected to an A/D conversion unit 109 and the D/A conversion unit 110 via a bus. As will be described in detail later, the micro-processor 105 performs servo control by loading a servo error signal from the A/D conversion unit 109 and outputting a servo processing result via the D/A conversion unit 110. Servo control includes general focusing servo, tracking servo, and coarse tracking servo operations. In addition, servo control also includes transient focusing and tracking locking operations and the like. However, it is assumed that in this embodiment, these locking operations have already been completed.

Note that a two-stage actuator arrangement is prepared for a tracking servo operation. With this arrangement, a tracking servo operation is performed to cause a beam spot from an optical system 114 to trace an information track by finely moving an objective lens (not shown), arranged in the optical system 114, in the tracking direction upon driving of a tracking actuator. In addition, the optical head including the optical system 114 and an actuator 115 is driven by a linear motor (not shown) to move in the radial direction of the magnetooptical disc 117, as described above. When the objective lens moves to the limit of a movable range during a general tracking operation, control is performed to move the overall optical head so as to cause the objective lens to return to the center of the optical system 114. Such control is called coarse tracking servo, which is performed on the basis of a position detection signal from an objective lens position detecting unit 113 for detecting the position of the objective lens in the tracking direction. The actuator 115 includes a tracking actuator and a focusing actuator for focusing servo.

Figure 15:
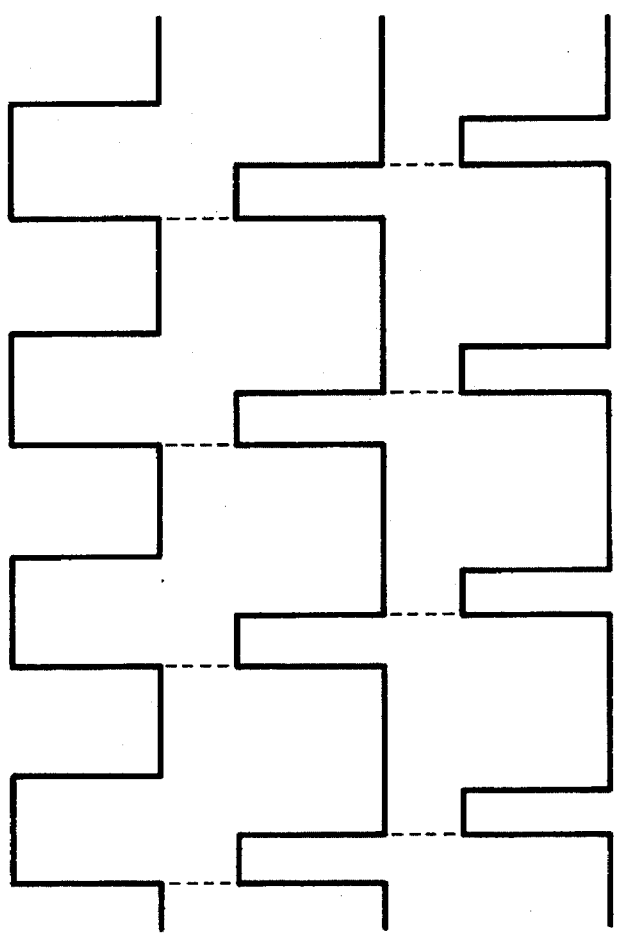
FIGS. 15A, 15B, and 15C are timing charts respectively showing a conversion start signal, a busy signal, and an interrupt signal in the arrangement shown in FIG. 14.

A timer circuit 111 frequency-divides a clock signal output from the micro-processor 105 to generate, e.g., a 50-kHz clock signal. In synchronism with this clock, a conversion start signal a is output to the A/D conversion unit 109, as shown in FIG. 15A. The A/D conversion unit 109 has four input terminals CH0 to CH3. A sum total signal, an objective lens position signal, a focusing error signal, and a tracking error signal are respectively input to the input terminals CH0 to CH3. When the conversion start signal a is input, the respective signals input to the input terminals CH0 to CH3 are sequentially converted into digital signals. The values obtained by A/D-converting the respective input signals in the A/D conversion unit 109 are held until the next conversion start signal a is input. When A/D conversion is performed in the A/D conversion unit 109, a busy signal b indicating that A/D conversion is being performed is output to the micro-processor 105, as shown in FIG. 15B.

The optical system 114 incorporates an optical sensor for detecting light reflected by the magnetooptical disc 117. The sum total of reception signals from this optical sensor will be referred to as a sum total signal. When focusing servo control fails, the amount of light received by the optical sensor decreases, and the level of this sum total signal also decreases. Therefore, the sum total signal is used to detect if focusing servo control has failed. A tracking error signal and a focusing error signal are detected by an error signal detecting unit 112 on the basis of reception signals from the optical sensor. An objective lens position signal is detected by the objective lens position detecting unit 113 and sent to the A/D conversion unit 109.

The timer circuit 111 outputs a signal c to the micro-processor 105 with a delay of a predetermined period of time with respect to the conversion start signal a, as shown in FIG. 15C. This signal c is output, as an interrupt signal c, to the micro-processor 105. Upon reception of this signal c, the micro-processor 105 stops the current processing and performs interruption processing for servo control. In performing interruption processing, the micro-processor 105 confirms from the busy signal b that the A/D conversion unit 109 is not performing A/D conversion. Thereafter, the A/D conversion value of the tracking error signal at the input terminal CH3 of the A/D conversion unit 109 is read, and filter calculation processing is performed. The result of the filter calculation processing is output to the D/A conversion unit 110 to be converted into an analog value. This value is then output to a drive circuit 116.

The drive circuit 116 is a drive circuit for driving the tracking actuator, the focusing actuator, and the linear motor. The drive circuit 116 drives the tracking actuator on the basis of an output from the D/A conversion unit 110 to perform a tracking servo operation so as to cause a beam spot to trace a track. Filter calculation in the micro-processor 105 will be described in detail later. When the filter calculation for the tracking servo operation is completed, the micro-processor 105 reads the A/D conversion value of the focusing error signal at the input terminal CH2 of the A/D conversion unit 109, and performs filter calculation on the basis of the read value. The filter calculation result is converted into an analog value by the D/A conversion unit 110. The drive circuit 116 drives the focusing actuator on the basis of the analog value to perform a focusing servo operation so as to focus a beam spot on a recording layer of the magnetooptical disc 117.

Subsequently, the micro-processor 105 reads the A/D conversion value of the objective lens position signal at the input terminal CH1 of the A/D conversion unit 109, and performs filter calculation on the basis of the read value. Similar to the above operation, the filter calculation result is converted into an analog value by the D/A conversion unit 110, and the drive circuit 116 drives the linear motor on the basis of the analog value, thereby performing a coarse tracking servo operation. Finally, the micro-processor 105 reads the A/D conversion value of the sum total signal at the input terminal CH0 of the A/D conversion unit 109, and checks on the basis of the level of the sum total signal whether focusing servo control has failed.

In this manner, the micro-processor 105 reads the A/D conversion values from the A/D conversion unit 109 in the order of the tracking error signal, the focusing error signal, and the objective lens position signal, and performs the filter calculation on the basis of the read values, thereby performing servo control including tracking servo, focusing servo, and coarse tracking servo operations. When the next conversion start signal a is input to the A/D conversion unit 109, as shown in FIG. 15A, the A/D conversion unit 109 performs A/D conversion again in the order to a sum total signal, an objective lens position signal, a focusing error signal, and a tracking error signal. When the interrupt signal c is input a predetermined period of time after the input of the conversion start signal a, as shown in FIG. 15C, the micro-processor 105 performs filter calculation in the order of the tracking error signal, the focusing error signal, and the objective lens position signal. In this manner, the micro-processor 105 performs servo control including tracking servo, focusing servo, and coarse tracking servo at a period of, e.g., 50 kHz. Note that system control other than servo control is performed after interruption processing is completed.

Figure 16:
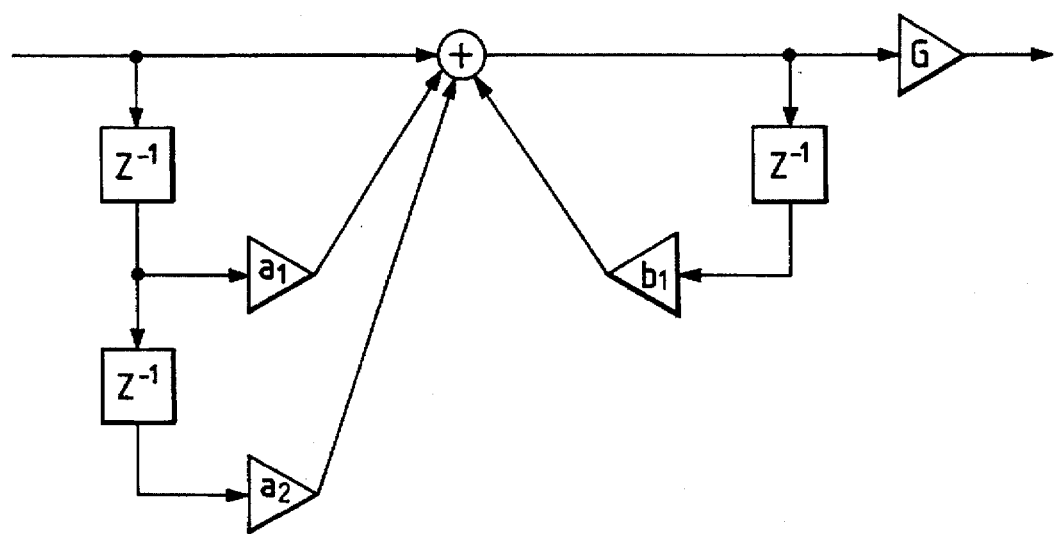
FIG. 16 is a block diagram showing an arrangement for a filter calculation operation for tracking servo processing.

Filter calculation for a tracking servo operation will be described next with reference to FIG. 16. The arrangement shown in FIG. 16 includes a delay element $Z^{-1}$, filter constants $a_1$, $a_2$, and $b_1$, and a gain G. In this arrangement, the sum total of a conversion result obtained by the A/D conversion unit 109 in a given period, a value obtained by multiplying a value obtained by A/D conversion one period before the given period by the filter constant $a_1$, a value obtained by multiplying a value obtained by A/D conversion two periods before the given period by the filter constant $a_2$, and a value obtained by multiplying a result obtained by filter calculation one period before the given period by the filter constant $b_1$, is multiplied by the gain G. The resultant value is output, as a filter calculation result, to the D/A conversion unit 110. The delay element $Z^{-1}$ serves to delay A/D conversion values or filter calculation results obtained one or two periods before a given period.

In performing servo control, an output from the A/D conversion unit 109 is loaded into the micro-processor 105, and the filter calculation result is output to the D/A conversion unit 110. However, a processing delay between A/D conversion and D/A conversion appears as a phase delay of a servo characteristic. For this reason, in this embodiment, the highest priority is given to a tracking servo operation susceptible to the adverse influence of a phase delay, whereas lower priorities are given to a coarse tracking servo operation and error processing performed when focusing servo control fails, which are less adversely affected by a phase delay. That is, as described above, A/D conversion of a tracking error signal by the A/D conversion unit 109 is performed last, and filter calculation for a tracking servo operation by the micro-processor 105 and D/A conversion by the D/A conversion unit 110 are performed first, thereby minimizing the processing delay between A/D conversion and D/A conversion.

If three servo operations, i.e., tracking servo, focusing servo, and coarse tracking servo operations, are performed at different periods, many interruptions occur in the micro-processor 105, resulting in an extra time for saving processing of registers and the like. That is, processing other than interruption processing is suspended for a long period of time. For this reason, in this embodiment, three servo control operations are performed at the same period within the same interruption processing to shorten the extra time for saving processing of registers and the like, thereby allowing efficient use of the micro-processor 105.

If A/D conversion in the A/D conversion unit 109 and input of an interrupt signal to the micro-processor 105 are performed at the same timing, while interruption processing is performed, the processing must wait until A/D conversion is completed. Therefore, this waiting time is shortened by outputting the interrupt signal c to the micro-processor 105 a predetermined period of time after the conversion start signal a is output to start A/D conversion. As this predetermined time, an optimal time is preferably selected in consideration of the time required for A/D conversion and the time interval between the instant at which interruption processing is started and the instant at which the A/D conversion result is read. Assume that the time required for A/D conversion is 1 µs, and the time interval between the instant at which interruption processing is started and the instant at which the A/D conversion result is read is 0.5 µs. In this case, as the predetermined period of time, 1 µs–0.5 µs=0.5 µs may be set. If the time interval between the instant at which interruption processing started and the instant at which the A/D conversion result is read is not constant, the longest time interval may be set as the predetermined period of time.

In this embodiment, servo control performed by the micro-processor 105 has been described in detail. If, however, the above three servo control operations are not performed in processing other than normal processing in the micro-processor 105, i.e., interruption processing, processing having the highest priority may be performed first. For example, focusing servo processing is performed first, and seek processing of the optical head is then performed. In addition, by using the busy signal b from the A/D conversion unit 109 as an interrupt signal to the micro-processor 105, interruption processing can be started at the same time when A/D conversion is completed. In this case, since the micro-processor 105 need not check, during the execution of interruption processing, whether A/D conversion is completed, the processing to be performed by the micro-processor 105 can be reduced. Furthermore, since a special interrupt signal need not be output to the micro-processor 105, the hardware arrangement can also be simplified.

Figure 17:
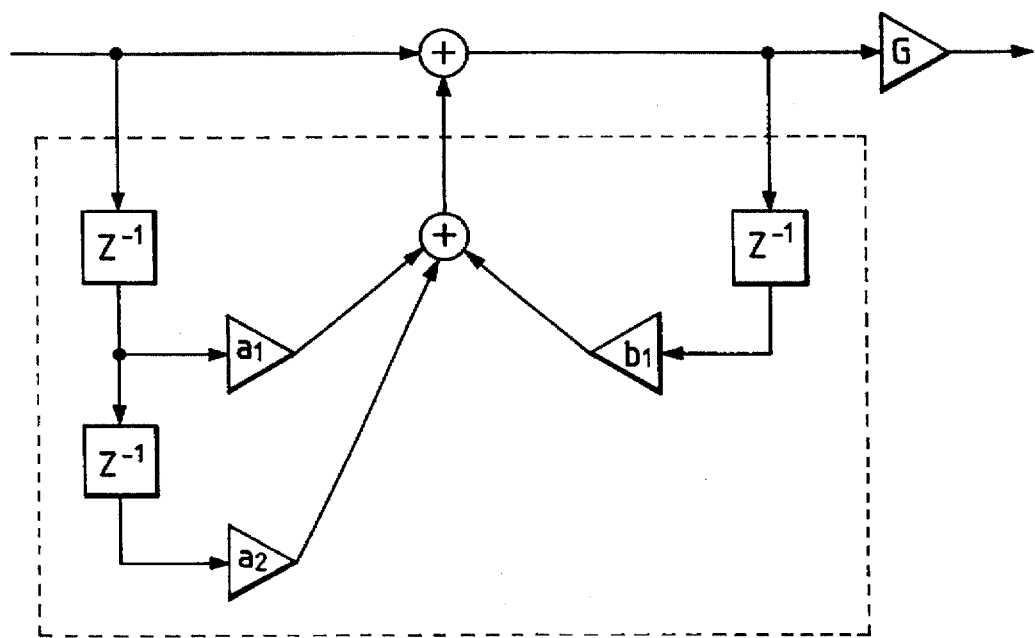
FIG. 17 is a block diagram showing an arrangement for another filter calculation operation.

When the micro-processor 105 performs filter calculation, it takes a significant amount of time for multiplication processing, resulting in a long delay time before D/A conversion. In this case, as is apparent from FIG. 16, the values used for filter calculation, other than the current A/D conversion result, are values determined one and two periods before the current period. Therefore, the following operation may be performed. As indicated by the broken line in FIG. 17, values which have already been determined are multiplied by the constants $a_1$, $a_2$, and $b_1$, and the sum total of the products is calculated in advance. The obtained value and the current A/D conversion result are added, and the sum is then output to the D/A conversion unit 110. If arithmetic processing for the next filter calculation is performed with respect to all servo targets for every period of servo processing, the phase delay of a servo characteristic can be reduced.

[Fourth Embodiment]

The fourth embodiment of the present invention will be described in detail next with reference to the accompanying drawings.

Note that the arrangement of the disc apparatus of this embodiment is substantially the same as that of the disc apparatus of the first embodiment shown in FIG. 2, except for the functions of a micro-processor 5 and a signal processing unit 15. Therefore, the fourth embodiment will be described below with reference to FIG. 2.

Figure 18:
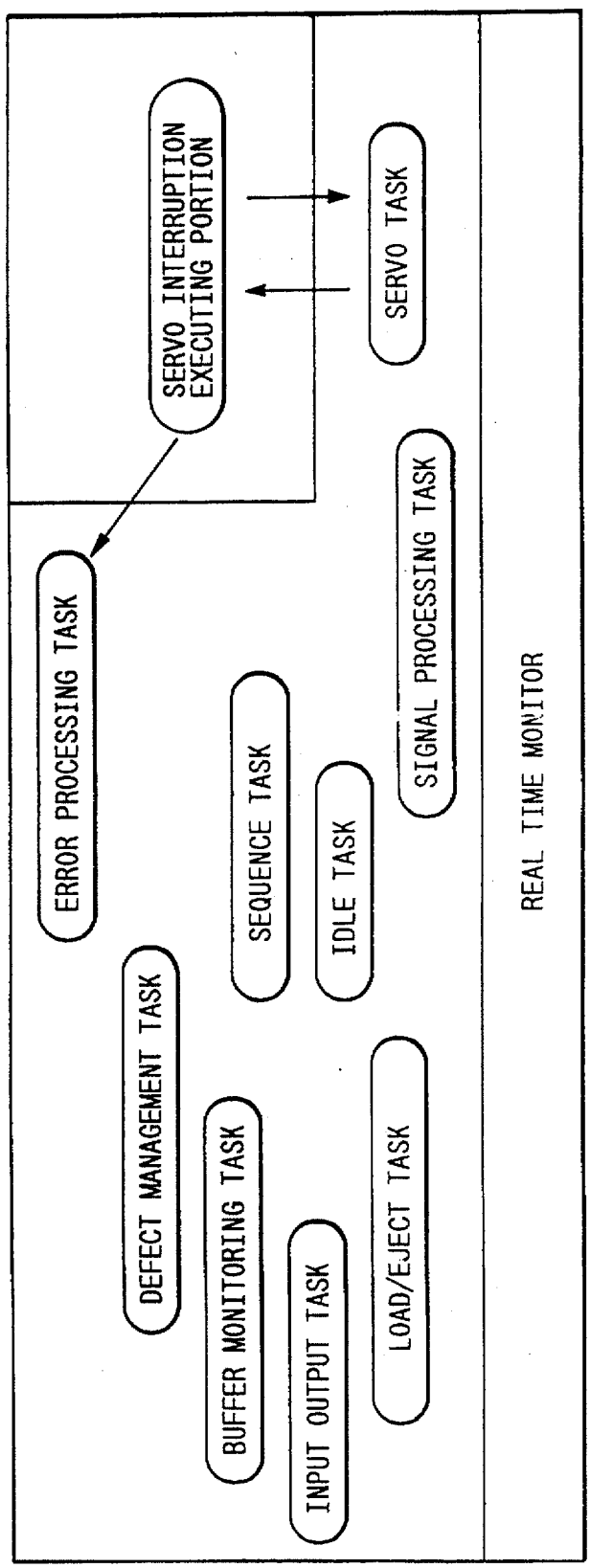
FIG. 18 is a schematic diagram showing a program configuration in the fourth embodiment.

FIG. 18 is a diagram which shows a program configuration in the micro-processor 5. This program configuration is a task management type configuration based on a real time monitor (synonymous with a real time OS). When a recording command is output from a host computer 17, the priority of an input/output task in FIG. 18 is assigned a high priority (designated by an event), and the input/output task is activated. In the input/output task, an input/output control unit 1 receives the command and performs the corresponding operation, and the micro-processor 5 receives the command. At this time, other tasks are set in a standby or stopped state. Servo control such as focusing/tracking control is time-divisionally performed in parallel with this input/output processing by this interruption processing. When the input/output processing is completed, the priority of the input/output task is lowered, and another task having a higher priority is activated. In this embodiment, control of data to be recorded/reproduced, load/eject control, error processing of the disc apparatus, automatic adjustment of a servo system, or automatic adjustment of a signal processing system are executed by task management, whereas servo control such as position control and seek control of an optical head is apparently executed in parallel with task execution according to a time-divisional processing form.

An operation of the above embodiment upon a power-on operation will be described next. When the power source of the disc apparatus is turned on, various initialization operations and initial checks are performed by the micro-processor 5. At this time, it is also checked whether a magnetooptical disc 16 is loaded in the disc apparatus. If the magnetooptical disc 16 is loaded, the disc 16 is rotated by a disc rotating mechanism 9, and a set-up process of the disc apparatus is performed in accordance with the following predetermined procedure. If the disc 16 is not loaded when the power source is turned on, rotation of the disc 16 and a set-up process are performed after the user sets the disc 16 in the disc apparatus. In any case, when the disc 16 is loaded, the disc 16 is rotated, and the set-up process of the disc apparatus is performed.

In the set-up process, first of all, a semiconductor laser as a light source arranged in an optical system 14 is turned on. An objective lens in the optical system 14 is then moved in the focusing direction to lock focusing servo control. When focusing servo control is locked, automatic adjustment of a focus offset is performed, as will be described in detail later. In a magnetooptical disc apparatus, a light beam is focused into a small beam spot by an objective lens to be irradiated on a disc. While the light beam is in a focused state, the amplitudes of the tracking error signal and the information reproduction signal increase. In contrast to this, as the light beam is defocused into a large beam spot, the amplitudes of the tracking error signal and the information reproduction signal decrease. In this embodiment, automatic focus offset adjustment is performed by using this characteristic. In addition, the focus point where the tracking error signal has the maximum amplitude slightly differs from the focus point where the information reproduction signal has the maximum amplitude owing to an aberration in an optical system. For this reason, in performing automatic focus offset adjustment, coarse adjustment is performed first by using a tracking error signal to be ready for tracking servo control, and fine adjustment is then performed by using an information reproduction signal.

When focusing servo control is locked, the micro-processor 5 loads a tracking error signal from an error detector 13 via an A/D and D/A conversion unit 11, and measures the amplitude of the tracking error signal and its offset when a light beam crosses tracks. In this case, the micro-processor 5 sequentially applies several different offsets to a focusing servo loop, and detects the amplitude of the tracking error signal for each offset, thereby detecting the focus offset at which the amplitude of the tracking error signal is maximized. This operation is the above coarse focus offset adjustment based on the tracking error signal.

Subsequently, a tracking servo loop is turned on to reproduce a signal recorded on the magnetooptical disc 16. Address information called a header portion is recorded on each recording sector of the magnetooptical disc 16. On a disc complying with the ISO standards, a signal having a relatively high frequency is recorded, as a focus offset adjustment signal, on a specific area. Fine adjustment of a focus offset and gain adjustment (setting of a parameter) of the amplitude of a reproduction signal are performed by using this address information and the signal for focus offset adjustment.

Figure 19:
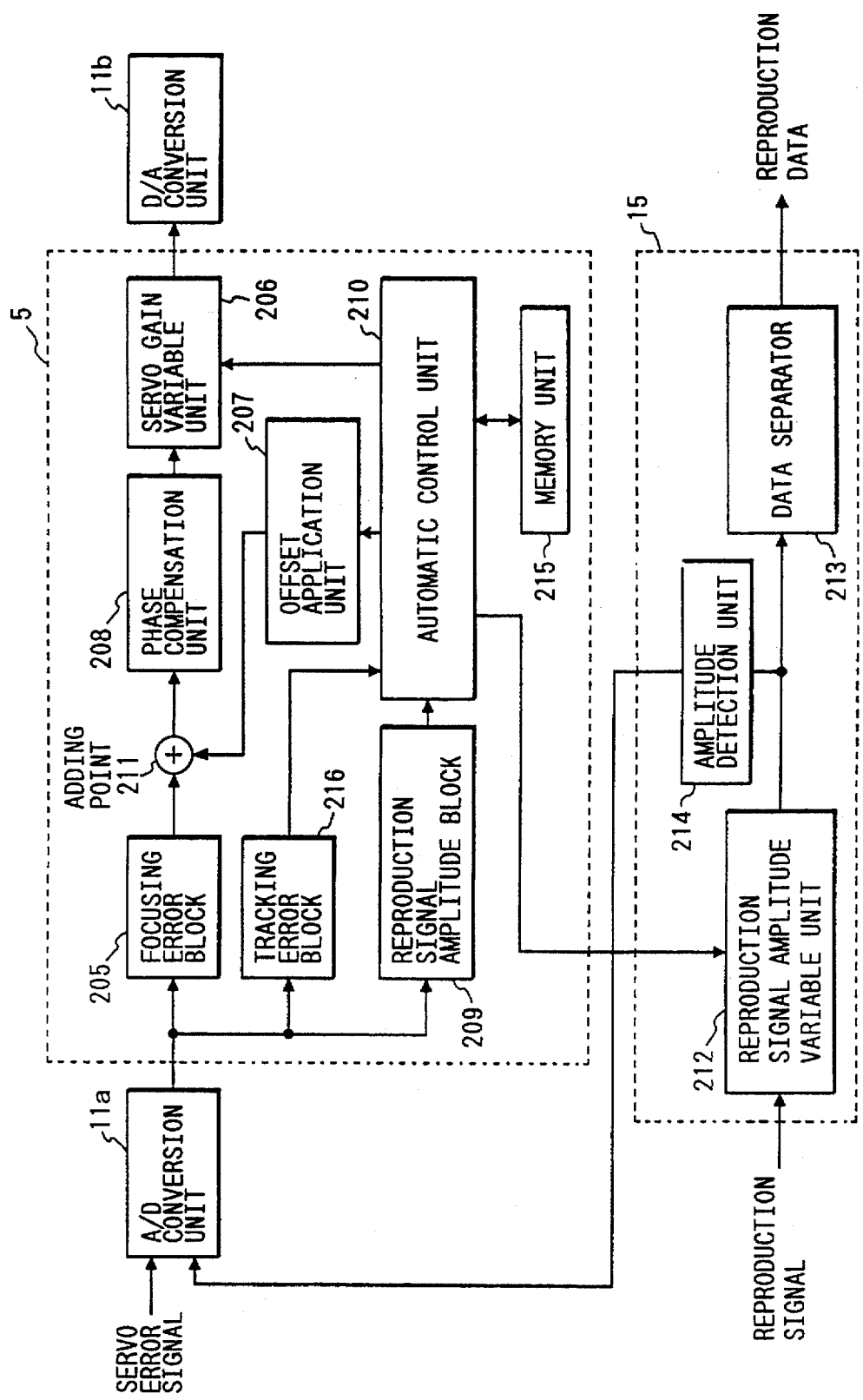
FIG. 19 is a block diagram showing the functions of a micro-processor and a signal processing unit in the fourth embodiment.

FIG. 19 is a block diagram showing the detailed functions of the micro-processor 5 and the signal processing unit 15 in this embodiment. Referring to FIG. 19, a focusing error signal and a tracking error signal obtained by the error detector 13 are loaded into the micro-processor 5 via an A/D conversion unit 11a. The A/D conversion unit 11a and a D/A conversion unit 11b in FIG. 19 are arranged in the A/D and D/A conversion unit 11 in FIG. 2. The focusing error signal is output to the D/A conversion unit 11b via a focusing error block 205, an adding point 211, a phase compensation unit 208, and a servo gain variable unit 206. After the focusing error signal is converted into an analog signal by the D/A conversion unit 11b, the analog signal is output to a driver (not shown) to drive a focusing actuator in an actuator 12a. A focusing servo loop is constituted by the above constituent elements from the error detector 13 to the focusing actuator to move the objective lens in the optical system 14 in the focusing direction, thereby performing focusing control of a beam spot.

The tracking error signal is sent to an automatic control unit 210 via a tracking error block 216. The automatic control unit 210 performs sequence control in the micro-processor 5, arithmetic processing for focus offset adjustment, and the like. A memory unit 215 is used to store data required for processing performed by the automatic control unit 210.

An information reproduction signal from the optical system 14 is input to the signal processing unit 15. This information reproduction signal is a reproduction signal obtained by reproducing the above-mentioned address information and focus offset adjustment signal. The signal processing unit 15 is constituted by a reproduction signal amplitude variable unit 212 for variably changing the amplitude of the reproduction signal, an amplitude detecting unit 214 for detecting the amplitude of the reproduction signal, and a data separator 213 for performing waveform equalization and binarization of the information reproduction signal, clock extraction, and the like. The reproduction signal amplitude detected by the amplitude detecting unit 214 is digitized by the A/D conversion unit 11a and sent to the automatic control unit 210 via a reproduction signal amplitude block 209. The automatic control unit 210 not only performs the above focus offset adjustment but also adjusts the gain of the reproduction signal amplitude variable unit 212 to set a parameter, as will be described in detail later.

A focus offset setting operation in the micro-processor 5 and a parameter setting operation in the signal processing unit 15 in this embodiment will be described in detail next. When focusing servo control is to be locked upon a power-on operation of the disc apparatus, the focusing and tracking error signals obtained by the error detector 13 are loaded into the micro-processor 5 via the A/D conversion unit 11a. At this time, since tracking servo control is OFF, the tracking error signal is a signal obtained when a light beam crosses tracks. The focusing error signal changes in the manner shown in FIG. 20 with respect to the defocus amount, and focus control is performed with a point a being considered as a target point.

In adjusting a focus offset, coarse focus offset adjustment is performed on the basis of the tracking error signal, as described above. In this coarse adjustment, the automatic control unit 210 instructs an offset application unit 207 to apply an offset to a focusing servo loop via the adding point 211, and detects the amplitude of the tracking error signal at this time. By increasing/decreasing the offset value, the automatic control unit 210 detects the offset value at which the amplitude of the tracking error signal is maximized. The obtained offset value is then applied from the offset application unit 207 to the adding point 211, and the coarse adjustment is completed. By performing coarse adjustment in this manner, the preparations for tracking servo control are completed.

Subsequently, tracking servo control is turned on to perform fine adjustment of a focus offset. In fine adjustment, address information and information in an offset adjustment area are reproduced and supplied to the signal processing unit 15, as described above. An amplitude is detected by the amplitude detecting unit 214 of the signal processing unit 15. The obtained amplitude value is loaded into the micro-processor 5 via the A/D conversion unit 11a. The automatic control unit 210 performs control to apply the offset set in the offset application unit 207 to the focusing servo loop via the adding point 211, and detects the amplitude of a reproduction signal from the reproduction signal amplitude block 209 in correspondence with the offset.

Figure 20:
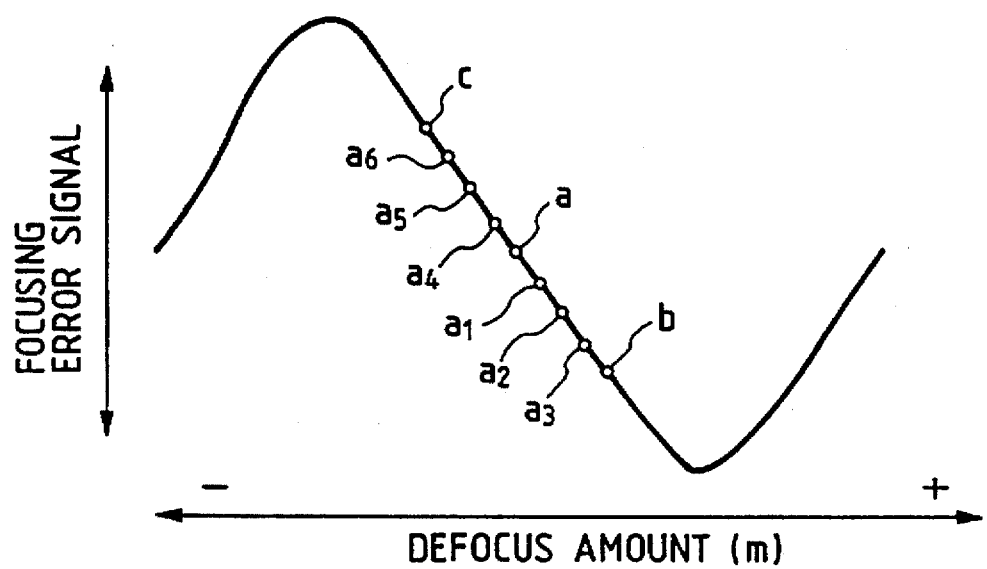
FIG. 20 is a graph showing a change in a focusing error signal with a change in defocus amount.
Figure 21:
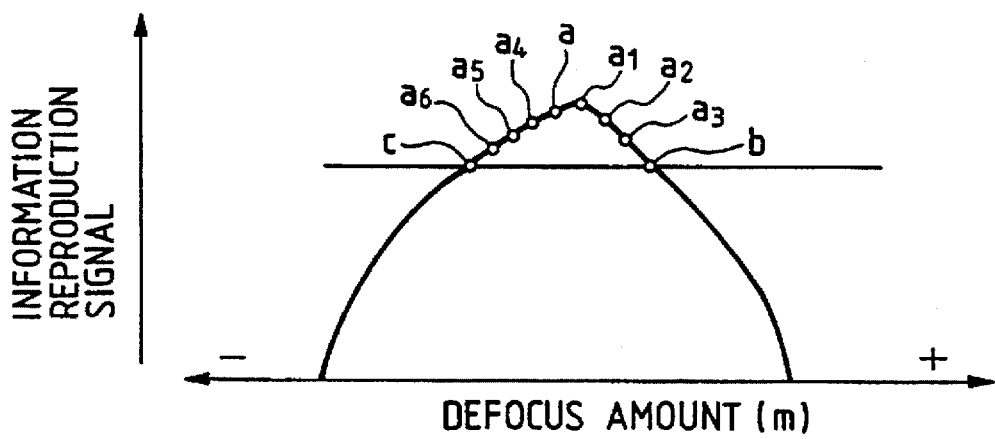
FIG. 21 is a graph showing a change in an information reproduction signal with a change in a defocus amount.

More specifically, assume that the focusing error signal has a value $a_1$ upon application of an offset voltage, as shown in FIG. 20. In this case, since the information reproduction signal changes in accordance with the defocus amount, the reproduced reproduction signal also has the value $a_1$, as shown in FIG. 21. The automatic control unit 210 then instructs the offset application unit 207 to sequentially increase the offset voltage as indicated by $a_2, a_3, \ldots$, as shown in FIG. 20, and detects the amplitude level of the reproduction signal for every offset voltage. These offset values and the corresponding reproduction signal amplitudes are stored in the memory unit 215. As the amplitude level of an information reproduction signal, a predetermined threshold level is determined in advance, as shown in FIG. 21. The automatic control unit 210 detects the offset, i.e., the level of the focusing error signal shown in FIG. 20, at which the amplitude level of the reproduction signal coincides with the threshold level. This level is obtained as an offset amount b, as shown in FIG. 20. Subsequently, the automatic control unit 210 sequentially decreases the offset voltage as indicated by $a_4$, $a_5$, $a_6$, ..., as shown in FIG. 20, and detects the amplitude level of the reproduction signal for every offset voltage. As is apparent, these offset values and the corresponding reproduction signal amplitudes are stored in the memory unit 215. The automatic control unit 210 detects the level of the focusing error signal at which the reproduction signal level coincides with the reproduction signal threshold level on the negative side of the defocus amount, as shown in FIG. 21. This level is obtained as an offset amount c, as shown in FIG. 20.

The automatic control unit 210 determines an offset to be set on the basis of the obtained offset amounts b and c. More specifically, the automatic control unit 210 calculates the mean value of the offset amounts b and c, and determines the obtained mean value a as an offset, as shown in FIG. 20. The automatic control unit 210 then sets this offset in the offset application unit 207, thereby completing fine adjustment of the focus offset. In this manner, a parameter is set in the servo system.

Subsequently, the automatic control unit 210 sets a parameter in the signal processing unit 15. More specifically, the automatic control unit 210 reads out a reproduction signal amplitude corresponding to the offset a from the memory unit 215, and sets a parameter in the reproduction signal amplitude variable unit 212 of the signal processing unit 15 on the basis of this reproduction signal amplitude. More specifically, the gain of the reproduction signal amplitude variable unit 212 is set to cause the amplitude of the reproduction signal to coincide with the predetermined amplitude level on the basis of the reproduction signal amplitude corresponding to the determined focus offset. By setting the gain to cause the reproduction signal amplitude to coincide with the predetermined level, high quality of the reproduction data is maintained, and information reproduction can be performed with high reliability. In this manner, the parameter setting operation in the signal processing unit 15 is completed, and all parameter setting operations in the servo system and the signal processing system upon a power-on operation of the disc apparatus are completed.

In this embodiment, an offset in focusing servo control is set on the basis of information reproduction signal amplitudes detected as the focus offset is changed. In addition, the gain of the signal processing unit 15 is set to cause the reproduction signal level to coincide with a predetermined level on the basis of the information reproduction signal amplitude corresponding to the set offset in focus servo control. Therefore, parameters for the servo system and the signal processing system need not be alternately set. In addition, since no time is required for communication between processors, parameters for the two systems can be accurately set within a short period of time. Furthermore, since servo control and a parameter setting operation can be performed by the signal micro-processor 5, a reduction in the cost of the disc apparatus can be achieved, as well as an improvement in development efficiency.

A modification of the fourth embodiment will be described next. In this modification, first of all, the automatic control unit 210 applies an offset to the focusing servo loop and detects a reproduction signal amplitude at this time. A parameter is set in the reproduction signal amplitude variable unit 212 of the signal processing unit 15 on the basis of the obtained reproduction signal amplitude. That is, the gain of the reproduction signal amplitude variable unit 212 is adjusted to cause the amplitude of the reproduction signal to coincide with a predetermined level on the basis of the reproduction signal amplitude. With this operation, the reproduction signal has a constant level of, e.g., 1 V. The parameter set at this time is stored in the memory unit 215, together with the applied offset. The automatic control unit 210 performs the same parameter setting operation as described above while sequentially changing the offset.

Figure 22:
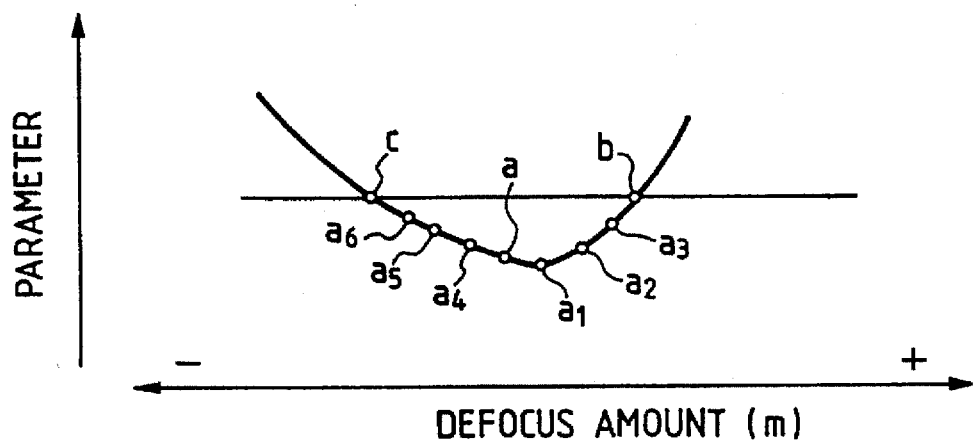
FIG. 22 is a graph showing a change in a parameter in the signal processing unit with a change in defocus amount.

If, for example, the focusing error signal has the value $a_1$ in FIG. 20 upon application of an offset, the information reproduction signal has the value $a_1$ in FIG. 21, i.e., a value slightly larger than the value a. The gain of the reproduction signal amplitude variable unit 212, i.e., a parameter, is set on the basis of this amplitude value in the same manner as described above. In this case, as a parameter, a value smaller than the value a is set, as indicated by reference symbol $a_1$ in FIG. 22. The automatic control unit 210 sequentially increases the offset as $a_3$, ..., as shown in FIG. 20, and sets a parameter in the error signal detecting unit 112 to cause the level of the reproduction signal to coincide with a predetermined level on the basis of a value obtained by detecting a reproduction signal amplitude for each offset. This parameter is stored in the memory unit 215, together with the applied offset. When the value of a parameter becomes equal to or larger than a predetermined parameter threshold, as shown in FIG. 22, as the offset is increased in this manner, a focusing error signal is obtained as a value b in FIG. 20. This value is also stored in the memory unit 215.

Subsequently, the automatic control unit 210 sequentially decreases the offset as $a_4$, $a_5$, $a_6$, ..., as shown in FIG. 20, and detects the amplitude of the reproduction signal for each offset, thereby setting a parameter in the error signal detecting unit 112. When the value of a parameter becomes equal to or larger than a predetermined parameter threshold, as shown in FIG. 22, a focusing error signal is obtained as a value c in FIG. 20. This value is stored in the memory unit 215. The automatic control unit 210 determines an offset to be set on the basis of the obtained values b and c. Similar to the above embodiment, the mean value a of the values b and c is determined as an offset to be set. In addition, the automatic control unit 210 finally sets a parameter in the reproduction signal amplitude variable unit 212 of the signal processing unit 15 on the basis of the data stored in the memory unit 215. That is, a parameter (the value a in FIG. 22) corresponding to the set offset value a is finally set in the reproduction signal amplitude variable unit 212 of the signal processing unit 15.

In this modification, even in a state wherein a focus offset is generated, the quality of a reproduction signal can be improved by making a reproduction signal amplitude have a constant value, thereby considerably improving the measurement precision of a reproduction signal amplitude detected by the automatic control unit 210 for adjustment. In addition, address information contained in a reproduction signal is constantly reproduced during the above adjustment. The measurement timing for the amplitude of a reproduction signal is set on the basis of this address information, or it is checked from the address information whether the current track is in a focus adjustment region. In setting a parameter, an information reproduction signal must be properly reproduced even in a defocus state. In this embodiment, since a reproduction signal amplitude can be accurately detected even in a defocus state, a parameter can be accurately set.

In this modification, each parameter set in the reproduction signal amplitude variable unit 212 is stored in the memory unit 215. If, however, a parameter is set again by measuring a reproduction signal amplitude when an offset is finally determined, a parameter and a corresponding offset value need not be stored in the memory unit 215 every time the focus offset is changed. In this case, the memory unit 215 can be omitted.

Figure 23:
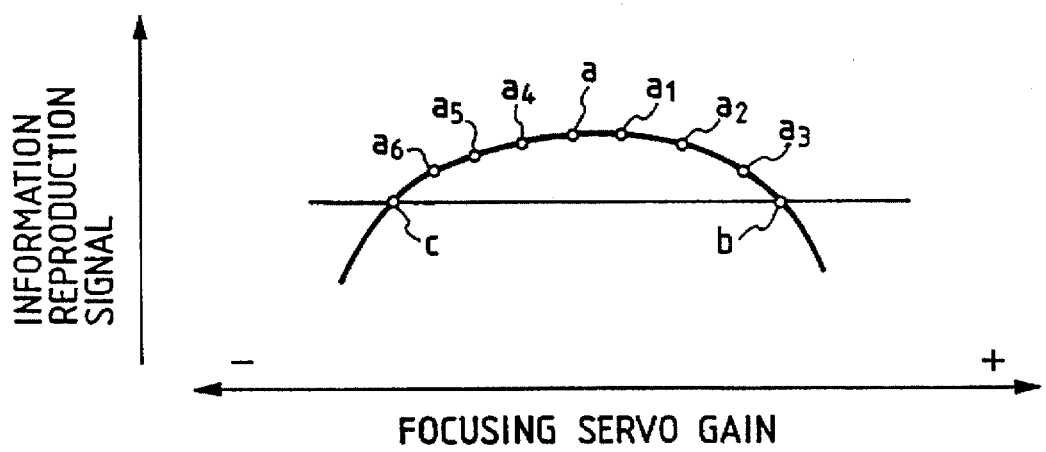
FIG. 23 is a graph showing a change in an information reproduction signal with a change in focusing servo gain.

Another modification of the fourth embodiment will be described next. FIG. 23 shows the relationship between the focusing servo gain and the information reproduction signal amplitude. As is apparent from FIG. 23, similar to the defocus characteristic of the information reproduction signal in FIG. 21, the amplitude of the information reproduction signal decreases if the focusing servo gain is too small or large. The reasons for this phenomenon are that a small servo gain leads to poor servo control performance and defocusing, and a high servo gain leads to low stability of a servo loop and oscillation, resulting in defocusing again. In the modification, a focusing servo gain is set by using this relationship.

This modification will be described in detail below. First of all, the automatic control unit 210 sets a predetermined gain, e.g., a gain of 1, in the servo gain variable unit 206, and detects the amplitude value of an information reproduction signal at this time. The automatic control unit 210 stores the obtained amplitude value in the memory unit 215, together with the set gain. Subsequently, the automatic control unit 210 sets a gain, e.g., a gain of 1.1, slightly higher than the previously set gain in the servo gain variable unit 206. At this time, the information reproduction signal has a value $a_1$ in FIG. 23 owing to the set gain. This amplitude value is stored in the memory unit 215, together with the set offset. Subsequently, the gain of the servo gain variable unit 206 is increased stepwise, and the amplitude of the information reproduction signal is detected every time the gain is increased. As a result, reproduction signal amplitudes $a_2$ and $a_3$ are obtained, as shown in FIG. 23. In this case, when the reproduction signal amplitude becomes equal to or lower than the predetermined reproduction signal threshold in FIG. 23 as the gain is increased in this manner, the automatic control unit 210 obtains a set gain as the value b in FIG. 23.

The automatic control unit 210 then decreases the gain of the servo gain variable unit 206 stepwise, and detects a reproduction signal amplitude every time the gain is decreased. Each gain and a corresponding amplitude value are stored in the memory unit 215. In this case, the reproduction signal amplitude sequentially becomes values $a_4$, $a_5$, and $a_6$. The automatic control unit 210 obtains the set gain, i.e., a value c in FIG. 23, at which the reproduction signal amplitude becomes equal to or lower than the reproduction signal threshold. The value c is also stored in the memory unit 215. The automatic control unit 210 determines a gain to be set in the servo gain variable unit 206 on the basis of the obtained values b and c. In this case as well, a mean value a of the values b and c in FIG. 23 is determined as a gain to be set.

In addition, the automatic control unit 210 reads out a reproduction signal amplitude corresponding to the set gain a from the memory unit 215, and sets a gain in the reproduction signal amplitude variable unit 212 of the signal processing unit 15 on the basis of this value. That is, the gain of the reproduction signal amplitude variable unit 212, i.e., a parameter in the signal processing unit 15, is set on the basis of the reproduction signal amplitude corresponding to the set gain a such that the reproduction signal amplitude coincides with the predetermined value. In this modification, since the gain of a focusing servo loop is set on the basis of the amplitude of an information reproduction signal, the highest quality of the information reproduction signal can be maintained in terms of the stability of the servo loop as well.

As described above, according to this embodiment, parameters can be simultaneously set both in the servo system and the signal processing system by using one arithmetic processing means. In addition, the parameters in the servo system and the signal processing system need not be alternately calibrated, and there is no need to set a time required for communication with the arithmetic processing means. Therefore, the time required for calibration of parameters can be greatly shortened as compared with the prior art, and parameters can be accurately set.

[Fifth Embodiment]

Figure 24:
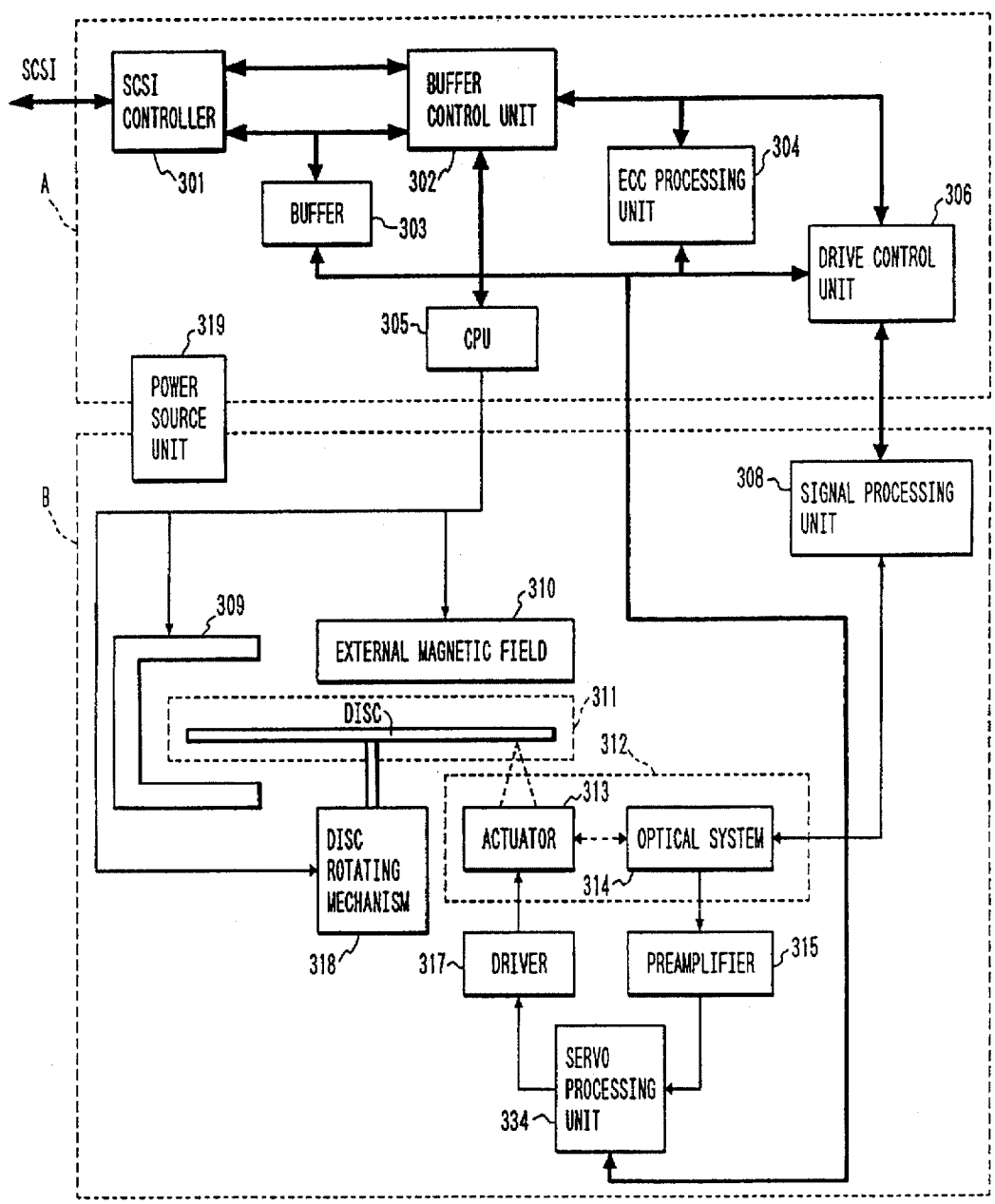
FIG. 24 is a block diagram showing the arrangement of a magnetooptical disc apparatus according to the fifth embodiment of the present invention.

The fifth embodiment of the present invention will be described in detail below with reference to the accompanying drawings. FIG. 24 shows the arrangement of a magnetooptical disc apparatus according to this embodiment. In this embodiment, control and servo processing of a drive B are performed by a CPU 305 for performing system control of a system control unit A. That is, all the control operations for the disc apparatus are performed by the signal CPU 305. Therefore, focusing and tracking servo processing is performed as digital signal processing by the CPU 305.

Figure 25:
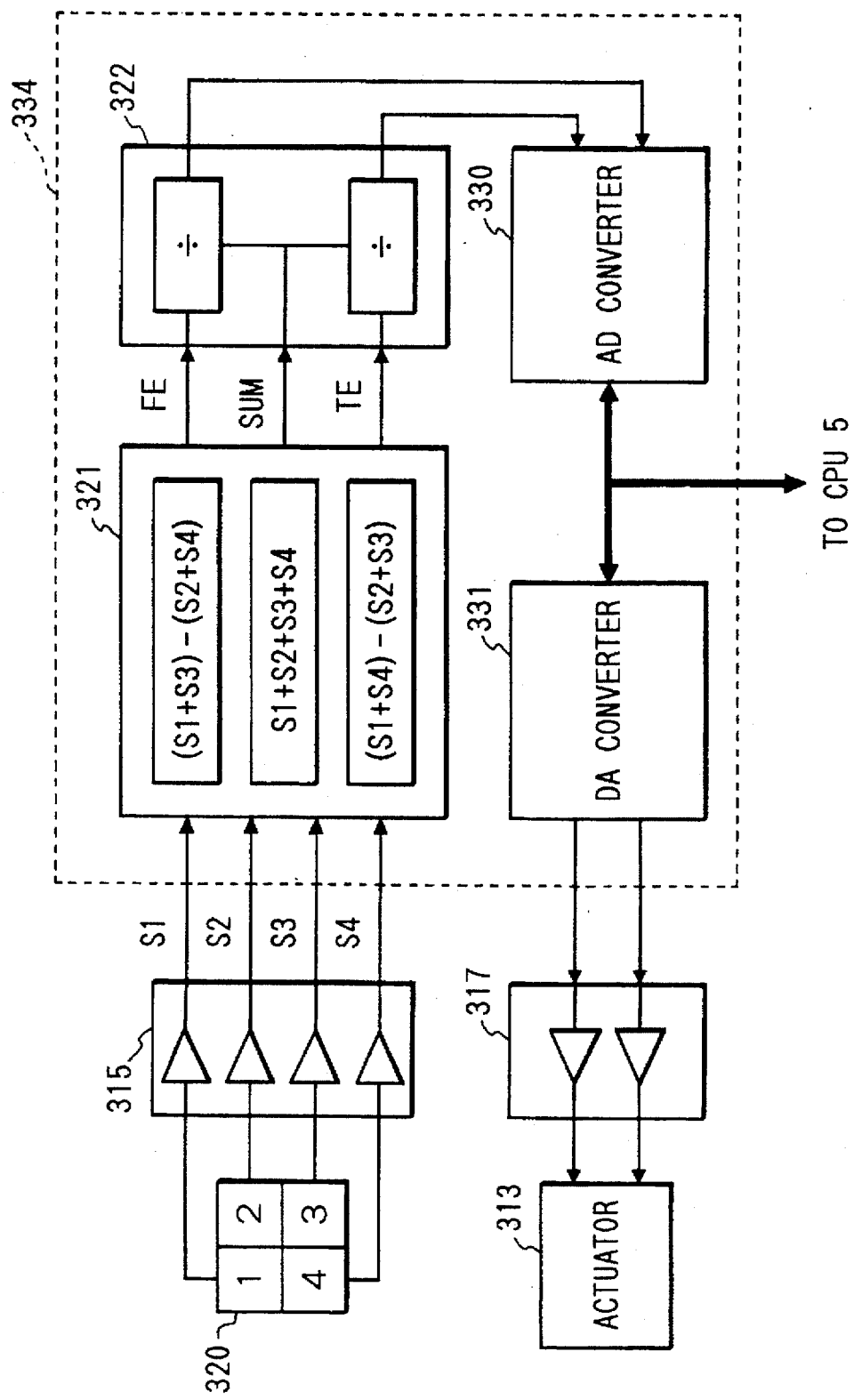
FIG. 25 is a block diagram showing the detailed arrangement of a servo processing unit and its peripheral circuits.

FIG. 25 shows the detailed arrangement of a servo processing unit 334 and its peripheral circuits. Referring to FIG. 25, the peripheral circuits are a four-division sensor 320, a preamplifier 315, a driver 317, and an actuator 313. The servo processing unit 334 incorporates an error signal generation device 321 and a normalization circuit 322. The focusing and tracking error detection schemes of the error signal generation device 321 use, for example, an astigmatism method and a push-pull method.

Referring to FIG. 25, light beams reflected by a magnetooptical disc 311 are received by the four-division sensor 320. The light beams are then photoelectrically converted into four current outputs by the four divided detection segments of the four-division sensor 320. The four current outputs from the four-division sensor 320 are current/voltage-converted by the four-channel preamplifier 315 and output as four voltage outputs S1, S2, S3, and S4. The four voltage outputs are arithmetically processed by the error signal generation device 321 to become a focusing error signal FE, a tracking error signal TE, and a sum total signal SUM. As shown in FIG. 25, the error signal generation device 321 calculates a focusing error signal according to (S1+S3)−(S2+S4); a tracking error signal according to (S1+S4)−(S2+S3); and a sum total signal according to (S1+S2+S3+S4). The outputs from the error signal generation device 321 are input to the normalization circuit 322. The normalization circuit 322 normalizes the focusing error signal by dividing it by the sum total signal, and also normalizes the tracking error signal by dividing it by the sum total signal. In this manner, the focusing and tracking error signals which cause no change in servo loop gain even with changes in the amount of light emitted from a semiconductor laser and the reflectance of the disc 311 are obtained.

The normalized focusing and tracking error signals are respectively converted into digital signals at a predetermined period by a two-channel A/D converter 330. The digital signals are then input to the CPU 305 via a bus at a predetermined period. The CPU 305 performs arithmetic processing for phase compensation and gain adjustment on the basis of the input focusing and tracking error signals, and outputs the processing results to a D/A converter 331 at a predetermined period. The signals obtained by D/A conversion are respectively input to focusing and tracking actuators in the driver 317, thereby driving the respective actuators. In this manner, servo processing is performed at a predetermined period, and the respective actuators are controlled in accordance with the processing results, thereby performing focusing control and tracking control. Note that ON/OFF control of the servo loop is performed depending on whether an output from the CPU 305 is supplied to the D/A converter 331.

As described above, in this embodiment, the CPU 305 functions as a phase compensation circuit, an amplifier, and a loop switch. In this case, although the phase compensation characteristic and the loop gain need to be changed in accordance with a difference in type between discs and a change in environment, the functions of the error signal generation device 321 and the normalization circuit 322 need not be incorporated into the CPU 305 since the functions in generation of the error signal and normalization of the error signal need not be changed in accordance with the difference in type between discs and the change in environment. If the functions of the error signal generation device 321 and the normalization circuit 322 are to be realized by calculation performed by the CPU 305, a large load of arithmetic processing, e.g., addition and subtraction of four outputs from the four-division sensor 320 and division by a total sum signal, is imposed on the CPU 305. In addition, although not shown, this disc apparatus includes a control system for a coarse actuator for a seek operation and the like. This system is also digitally controlled by the CPU 305.

In this embodiment, as described above, the signal CPU 305 performs digital control of a drive control unit 306, an ECC processing unit 304, a buffer control unit 302 for controlling a buffer memory 303, an SCSI controller 301, (a medium loading/ejecting mechanism 309, an external magnetic field 310, and a disc rotating mechanism 318 of the drive B), and the focusing, tracking, and coarse actuators. Of these control operations, servo processing such as focusing and tracking control is performed at a predetermined period. Other control operations must be performed in time intervals in which no servo processing is performed. For this reason, if a large load of arithmetic processing is performed for servo processing, which consumes a lot of time, the time for other control operations is shortened.

In order to solve this problem, in this embodiment, the error signal generation device 321 and the normalization circuit 322 are constituted by analog circuits, a focusing error signal and a tracking error signal output from the analog circuits are digitized by an A/D converter, and the obtained values are used for arithmetic processing performed by the CPU 305. Therefore, a large load of arithmetic processing, e.g., generation and normalization of error signals, need not be performed by the CPU 305, and the processing load on the CPU 305 can be reduced. Thus, the time required for servo processing can be shortened, and the above-described many operations can be processed by one inexpensive CPU. In addition, with the arrangement of this embodiment, the number of channels of the A/D converter can be decreased.

Figure 26:
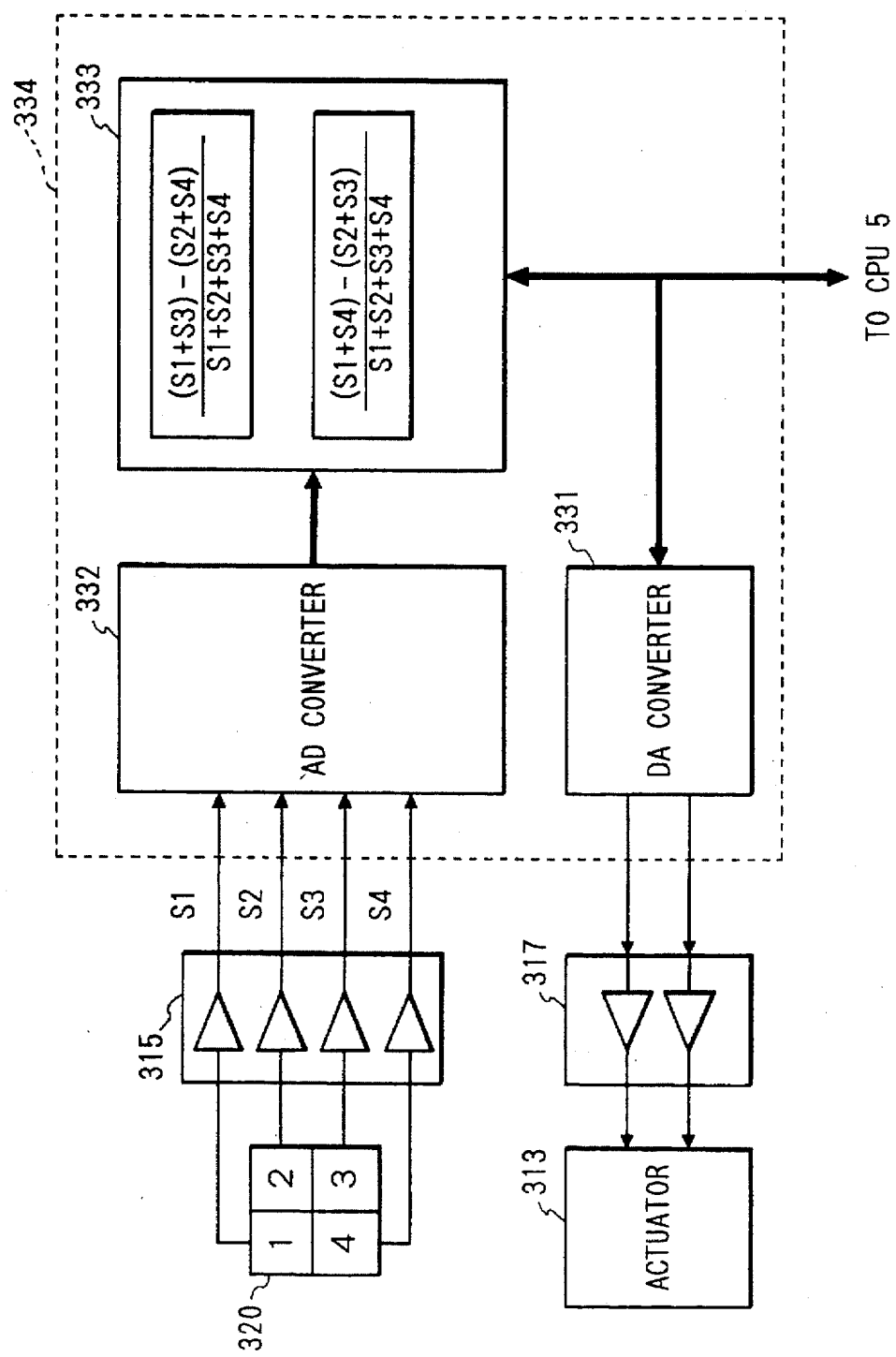
FIG. 26 is a block diagram showing another servo processing unit.

FIG. 26 shows a modification of the servo processing unit 334. In the modification shown in FIG. 26, the four voltages S1 to S4 output from the preamplifier 315 are respectively digitized by a four-channel A/D converter 332 at a predetermined period and output to a normalized error signal generation device 333. The normalized error signal generation device 333 digitally performs arithmetic processing of these digital values at a predetermined period to generate normalized focusing and tracking error signals. As shown in FIG. 26, the normalized error signal generation device 333 calculates a focusing error signal according to ((S1+S3)−(S2+S4))/(S1+S2+S3+S4); and a tracking error signal according to ((S1+S4)−(S2+S3))/(S1+S2+S3+S4). That is, the normalized error signal generation device 333 has the two functions of the error signal generation device 321 and the normalization circuit 322 in FIG. 25. The normalized error signal generation device 333 obtains a focusing error signal and a tracking error signal which cause no change in servo loop gain with changes in the amount of light emitted from a semiconductor laser and the reflectance of the disc 311 in the same manner as described with reference to FIG. 25.

The normalized focusing and tracking error signals are input to the CPU 305 via the bus at a predetermined period. The CPU 305 performs arithmetic processing for phase compensation and gain adjustment on the basis of the focusing error signal and the tracking error signal in the same manner as described above with reference to FIG. 25, and outputs the processing result to the D/A converter 331 at a predetermined period. The signals obtained by D/A conversion are respectively input to the focusing and tracking actuators in the driver 317, thereby driving the respective actuators. Focusing control and tracking control are performed by performing servo processing at a predetermined period in this manner. Similar to the above embodiment, ON/OFF control of the servo loop is performed depending on whether an output from the CPU 305 is supplied to the D/A converter 331. That is, in this modification as well, generation and normalization of error signals, which demand a large processing load, are not performed by the CPU 305, but the CPU 305 serves as a phase compensation circuit, an amplifier, and a loop switch. In addition, although not shown in FIG. 26, this modification includes a control system for a coarse actuator for a seek operation and the like. This system is also digitally controlled by the CPU 305.

In this modification, similar to the embodiment shown in FIG. 24, the CPU 305 performs digital control of the system control unit A, the drive B, and the focusing, tracking, and coarse actuators. In addition, similar to the embodiment shown in FIG. 24, if a large load of arithmetic processing is performed for servo processing, which consumes a lot of time, the time for other control operations is shortened. In this modification, however, outputs from the preamplifier 315 are digitized by the four-channel A/D converter 332, generation and normalization of error signals are performed by the normalized error signal generation device 333 on the basis of the digital values, and arithmetic processing is performed by the CPU 305 using the digital values outputted from the normalized error signal generation device 333. Therefore, a large load of arithmetic processing, e.g., generation and normalization of error signals, need not be performed by the CPU 305, and the processing load on the CPU 305 can be reduced. Thus, the time required for servo processing is short, and the above-described many operations can be performed by one inexpensive CPU. In addition, with the arrangement of this modification, an error signal generation circuit and a normalization circuit can be constituted by inexpensive elements such as gate arrays.

As described above, according to this embodiment, since generation and normalization of servo error signals and servo processing are independently performed, a large load of arithmetic processing, e.g., generation and normalization of servo error signals, need not be performed by the arithmetic processing means. Therefore, the load on the arithmetic processing means can be reduced, and the time required for servo processing can be shortened. For this reason, the arithmetic processing means can perform system control in time intervals in which no servo processing is performed, and servo processing and system control can be performed by an inexpensive CPU instead of an expensive high-speed CPU.

[Sixth Embodiment]

A wait jump method in a magnetooptical disc apparatus having one CPU will be described in detail below.

A wait jump is an operation of holding the reproduction point of an optical head on a portion having a predetermined track number of a magnetooptical disc having helical tracks. More specifically, pulses generated by a means for generating a pulse for every predetermined rotational angle of disc rotation are counted. The optical head is controlled such that when the count result coincides with one revolution of the disc, the reproduction point of the optical head is returned by a distance corresponding to one track.

The sixth embodiment will be described below with reference to FIG. 27.

Figure 27:
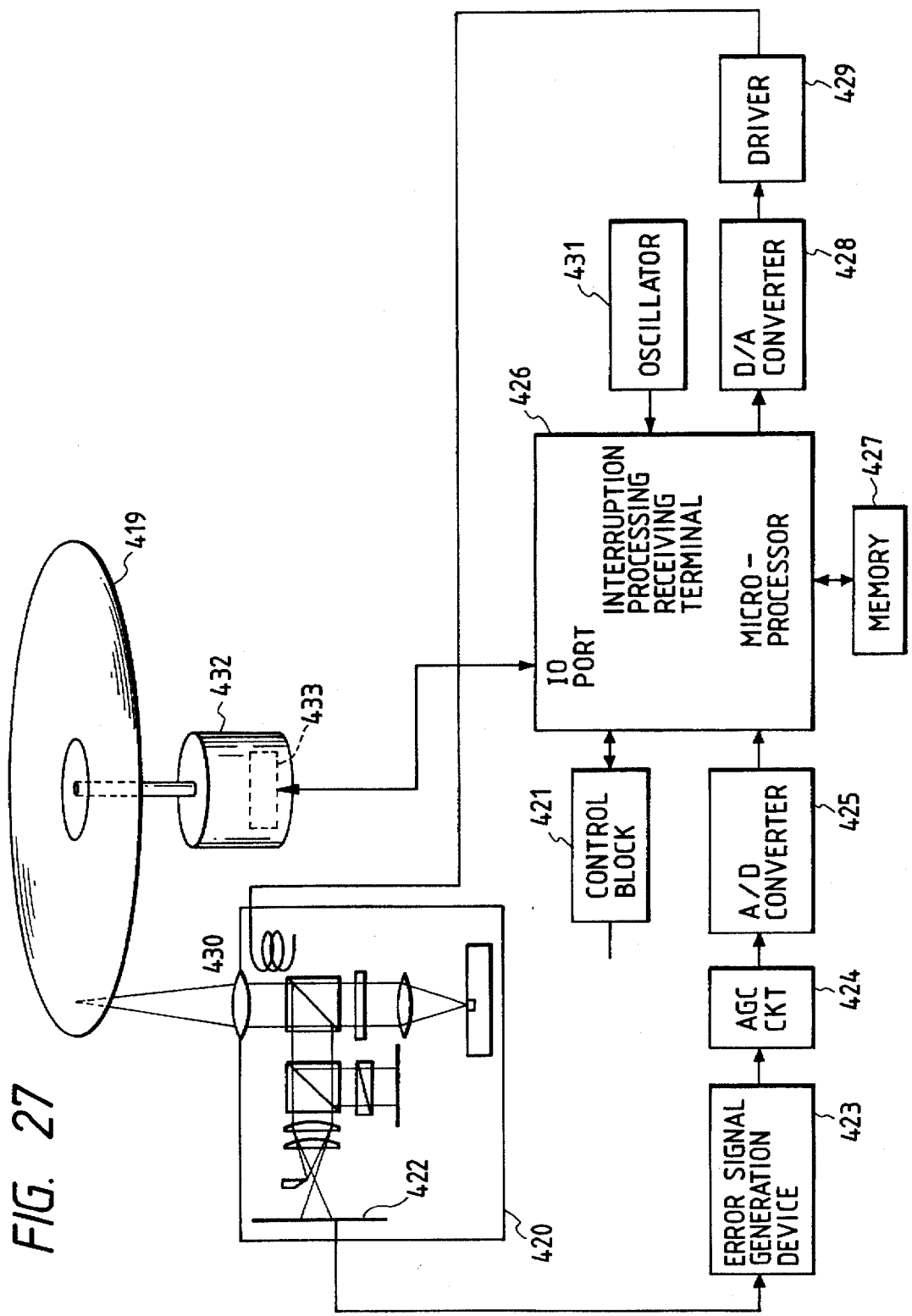
FIG. 27 is a block diagram showing the arrangement of a magnetooptical disc apparatus according to the sixth embodiment of the present invention.

Referring to FIG. 27, a magnetooptical disc apparatus of this embodiment includes a control block 421. The control block 421 has functions of communicating with a host computer arranged outside the system, temporarily storing data in a memory at the time of communication, performing abnormal processing in the occurrence of a system abnormality, and correcting errors in information. A sensor 422 generates a signal required for generation of position error information about the optical head by using light reflected by a magnetooptical disc 419. An error signal generation device 423 generates error signals such as a focusing error signal and a tracking error signal. An AGC circuit 424 eliminates variations in the amplitude level of an error signal caused by variations in light amount. An A/D converter 425 converts an error signal into a digital value.

A micro-processor 426 controls the control block 421 and performs digital servo arithmetic processing. The micro-processor 426 has an interruption processing receiving terminal. Upon reception of an interruption start signal at the interruption processing receiving terminal, the micro-processor 426 interrupts the processing which has been executed, and starts execution of a program written in an interruption processing program region. Upon completion of the interruption processing, the micro-processor 426 resumes the program which has been executed before the interruption processing was started. In this case, the micro-processor 426 resumes the program from an instruction next to the instruction which has been executed before the processing was interrupted. A memory 427 serves to store programs for operating the micro-processor 426. A D/A converter 428 converts an output calculated by the micro-processor 426 into an analog signal. A driver 429 supplies a current to its output terminal in accordance with the input signal from the D/A converter 428. An actuator 430 drives an objective lens in an optical system 420 in accordance with the current supplied from the driver 429.

An output from an oscillator 431 is input, as an interruption processing start signal, to the micro-processor 426. A disc rotating mechanism 432 causes a spindle motor to rotate a magnetooptical disc. A rotation detecting mechanism 433 serves as a pulse generating means for generating a predetermined pulse wave in accordance with the rotation of the disc.

Figure 28:
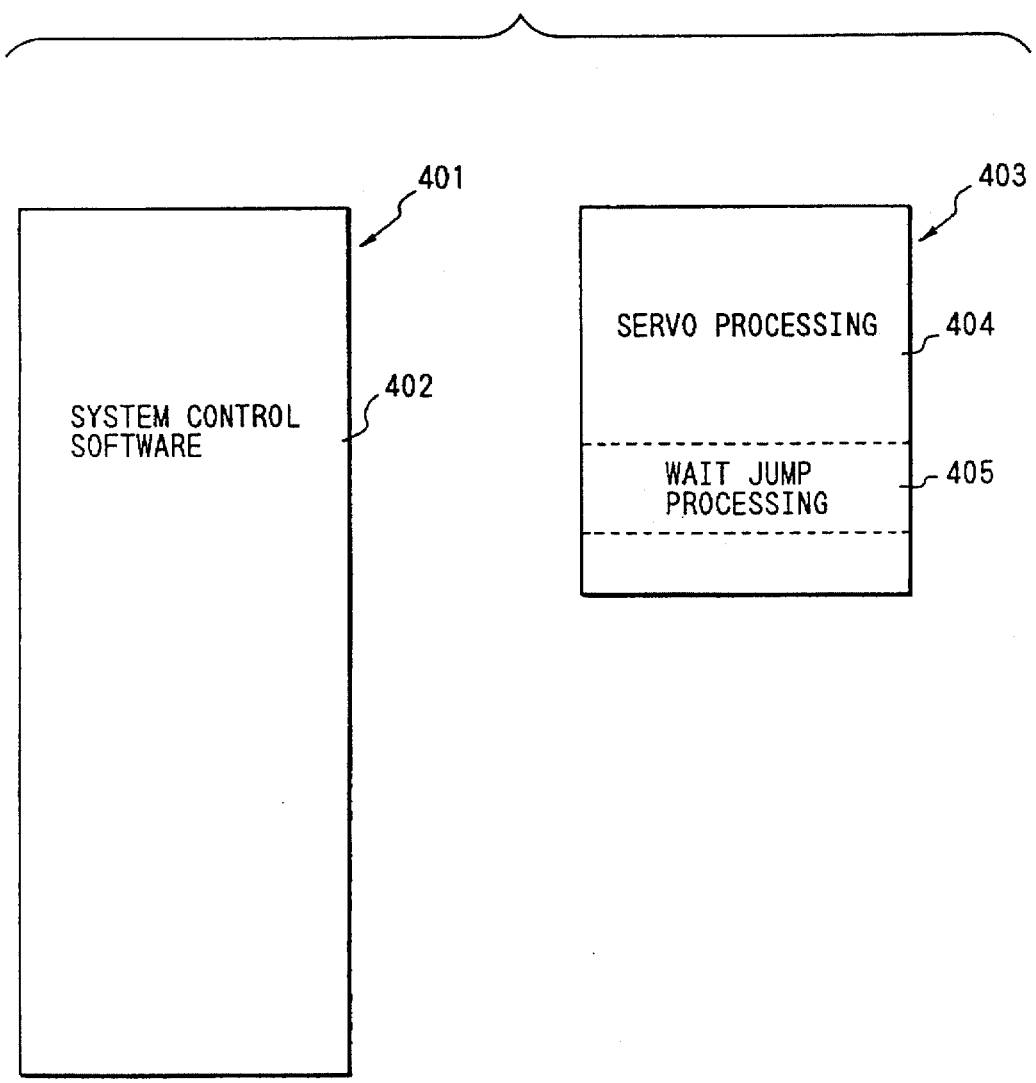
FIG. 28 is a view showing a software configuration in the sixth embodiment.

The software configuration of the sixth embodiment will be described next with reference to FIG. 28. This configuration includes an ordinary program region 401, in which system control software 402 is written. In the system control software 402, software for controlling the control block 421 shown in FIG. 27 is written. The system control software 402 serves to perform control of data for the host computer, ECC processing, data buffer control, SCSI control, and the like. The configuration also includes an interruption processing program region 403, in which servo processing 404 is written. The servo processing 404 includes servo processing such as focusing servo and tracking servo processing, and wait jump processing 405.

The operation of the sixth embodiment will be described below with reference to the above arrangement.

For example, the number of revolutions per minute of a disc in this magnetooptical disc apparatus is 3,600 rpm. That is, the time required for one revolution of the disc is 1/60 sec. The pulse generating means in the rotation detecting mechanism 433 generates 30 pulses while the disc is rotated once. That is, the pulse generating means generates one pulse every 555.6 μsec. In addition, this disc apparatus performs servo processing by interruption processing once every 20 μsec. That is, the oscillation frequency of the oscillator 431 is 50 kHz, and the number times that interruption processing is performed for every revolution of the disc is 833.3.

Figure 29:
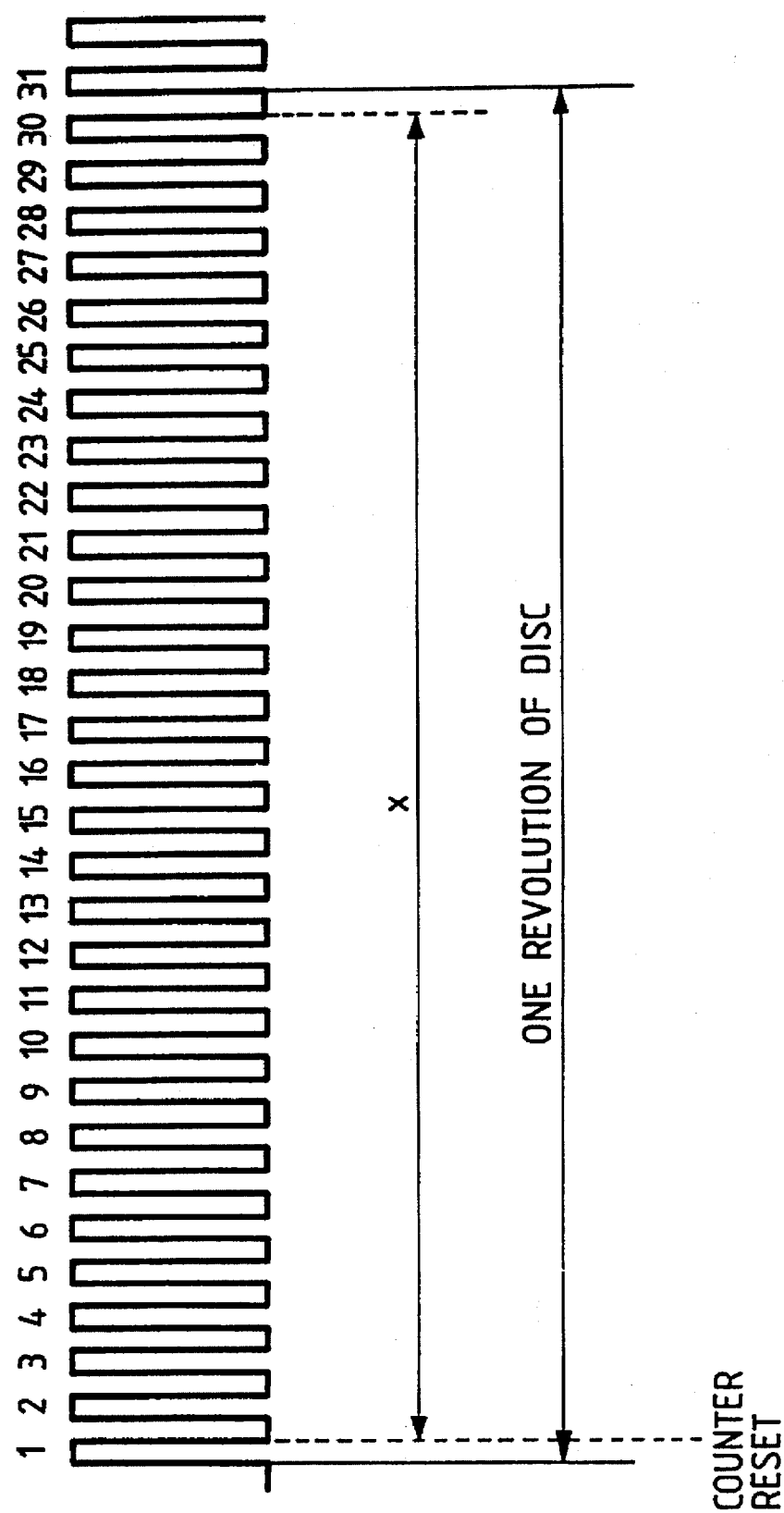
FIG. 29 is a timing chart showing a state of a pulse generating means during one revolution of a disc to explain the sixth embodiment.

A method of setting a timing for a wait jump will be described below with reference to FIGS. 29 and 30. In this embodiment, as indicated by a range x indicated by the arrows in FIG. 29, the time interval between the instant at which a counter is reset and the instant immediately before the 31st pulse is generated is counted as the number of times that interruption processing is performed. When the 31st pulse is generated at the output terminal of the pulse generating means, a wait jump is performed.

Setting of a time measured by a count means will be described below. In this disc apparatus, the number of times that interruption processing is performed for every revolution of a disc is 833.3. In order to measure the timer interval between the instant at which the counter is reset and the instant immediately before the 31st pulse is generated, a numerical value to be compared with the value of the counter must be smaller than 833.3. If time measurement ends before the pulse generating means starts to generate the 30th pulse, a wait jump is performed in response to a pulse generated before the 31st pulse. Consequently, wait jumps cannot be performed at a proper period. In addition, the time required for the pulse generating means to generate 29 pulses corresponds to the time required to perform interruption processing 805.6 times. Therefore, a numerical value to be compared must be 806 or larger.

Furthermore, a consideration must be given to the time interval between the instant at which a count value is compared and the instant at which wait jump processing is completed, i.e., the value of the counter is reset. In general, a processing time of about 300 μsec is required to perform wait jump processing. In this modification, a numerical value to be compared is set to be 816, which is an almost intermediate value between 806 to 833. With this setting, in the disc apparatus of the embodiment, a time shorter than the time taken for one revolution of a disc by about 340 μsec is detected.

The time interval between time a and time e in FIGS. 30A through 30C corresponds to the time required for wait jump processing. This time intervals, 340 μsec, is sufficiently shorter than 555.6 μsec as a period at which the pulse generating means generates pulses. With this setting, this disc apparatus can properly detect the 31st pulse. Therefore, there is no possibility that a wait jump is performed at a period shorter than the time required for one revolution of a disc.

Actual software processing in this disc apparatus will be described next. While no signal is input to the interruption processing terminal, the micro-processor 426 performs system control to perform control of data for the host computer, ECC processing, data buffer control, SCSI control, and the like.

The contents of wait jump processing will be described next. Assume that the micro-processor 426 receives an interruption processing start signal at the interruption processing receiving terminal. In this case, the micro-processor 426 starts a program written in the interruption processing program region.

Interruption processing will be described below with reference to FIGS. 30A through 30C and FIG. 31 showing a flow chart. Assume that interruption processing is started at time a in FIG. 30 (step S81). The micro-processor 426 then starts to execute servo processing (sv). The micro-processor 426 adds one to the counter value (step S82). The interruption processing count value in FIG. 30 indicates the counter value at this time. Assume that the counter value is 815 at this time. It is checked whether the counter value is a predetermined value (816 in this case) (step S83). As a result of this decision step, the flow advances to step S84. The micro-processor 426 sequentially performs a focusing servo operation (step S84), a tracking servo operation (step S85), and a tracing servo operation (step S86). Thereafter, the processing ends. As described above, if the counter value is smaller than the predetermined value, a wait jump is not performed, and the reproduction point of a light beam traces a track.

Figure 31:
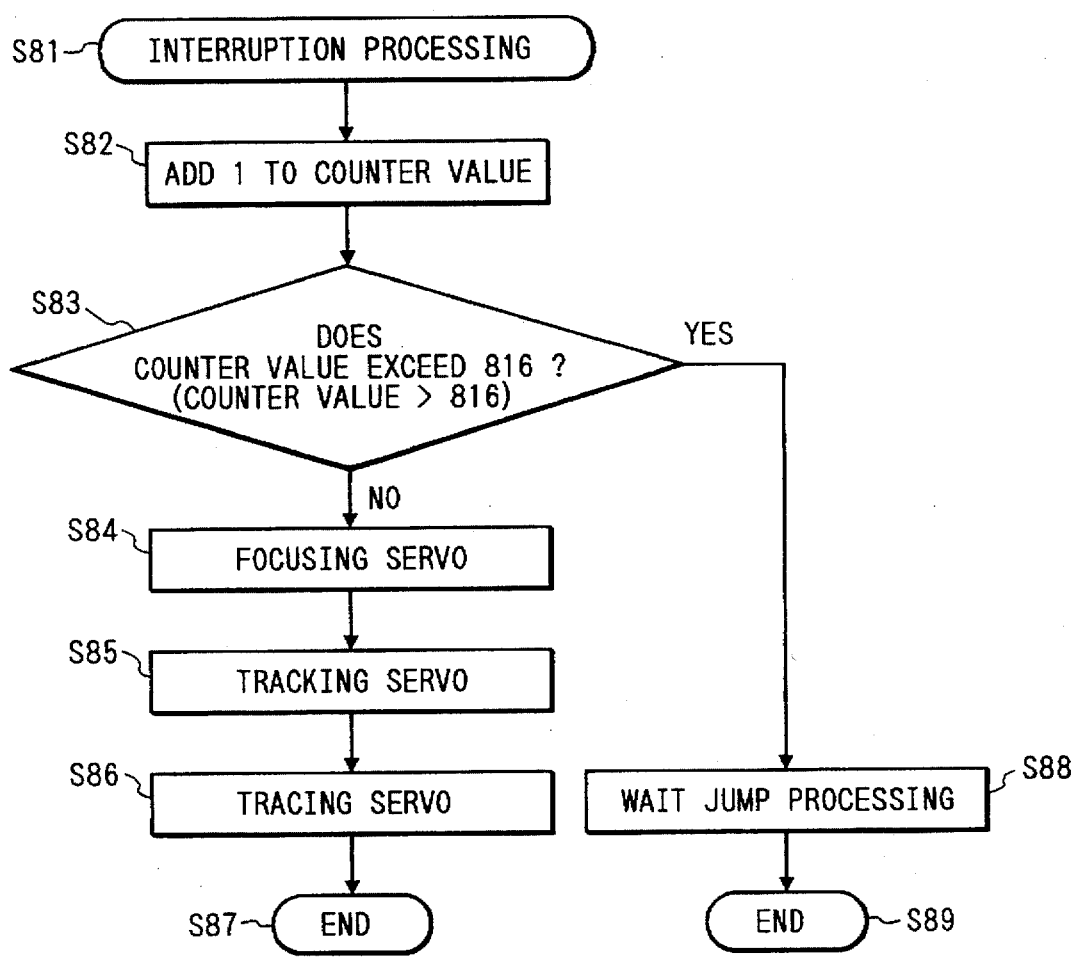
FIG. 31 is a flow chart showing a sequence of interruption processing in the sixth embodiment.

Processing to be performed when it is determined that the counter value is larger than the predetermined value (816) will be described next with reference to FIG. 31. Assume that interruption processing is started at time b in FIGS. 30A through 30C (step S81). The micro-processor 426 starts servo processing, and adds one to the counter value (step S82). In this case, the counter value becomes 816. Upon detecting that the counter value is equal to or larger than the predetermined value (816) (step S83), the micro-processor 426 starts to execute wait jump processing (Wa) (step S88).

Figure 32:
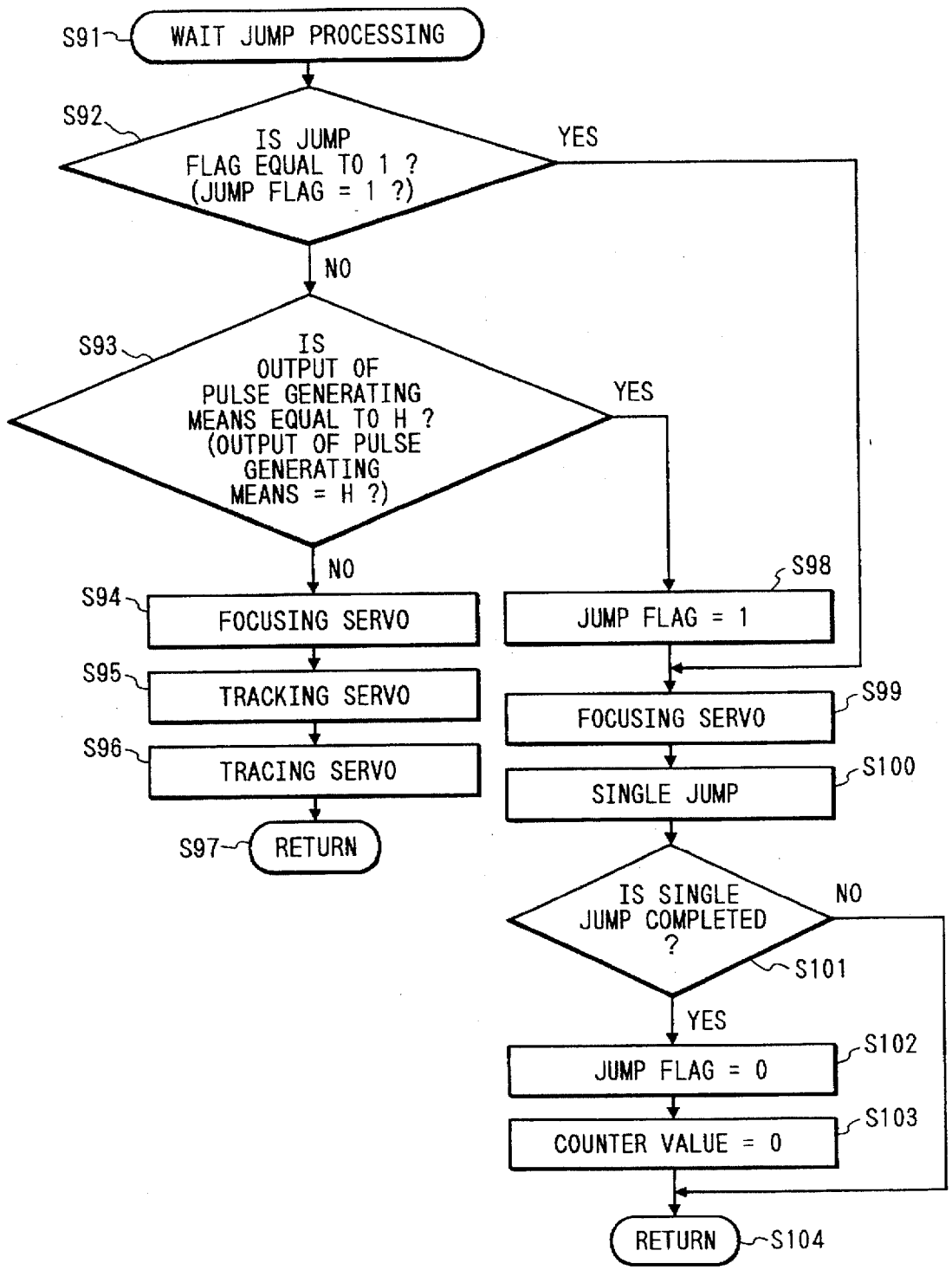
FIG. 32 is a flow chart showing a wait jump routine in the sixth embodiment.

The wait jump processing (step S88) will be described below with reference to FIG. 32. When the wait jump processing is started (step S91), the micro-processor 426 checks the value of a jump flag first (step S92). The initial value of the jump flag is 0. Therefore, the value of the jump flag at this time is also 0. When the jump flag is 0, the micro-processor 426 monitors an output from the pulse generating means (step S93). As shown in FIG. 30, the output from the pulse generating means at this time is at low level. Consequently, the micro-processor 426 executes a focusing servo operation (step S94), a tracking servo operation (step S95), and a tracing servo operation (step S96). In response to a return instruction (step S97), the flow returns to step S88 in FIG. 31, and the interruption processing ends (step S89). In this interruption processing as well, no wait jump is performed, and the reproduction point of a light beam traces a track. Thereafter, the micro-processor 426 resumes system processing (sy).

Assume that the current time becomes time c in FIGS. 30A through 30C, and the output from the pulse generating means changes from low level to high level. In this case, the micro-processor 426 starts interruption processing again in response to the next interruption processing start signal, and adds one to the counter value (step S82). At this time, the counter value becomes 817. Therefore, the flow advances to step S88 in FIG. 31 via the same route as that in the previous interruption processing so as to start the wait jump processing shown in FIG. 32. The micro-processor 426 checks the value of the jump flag (step S92). In this case as well, the jump flag is 0. For this reason, an output from the pulse generating means is monitored (step S93). At this time, the output from the pulse generating means is at high level. For this reason, the micro-processor 426 changes the value of the jump flag to one (step S98). Focusing servo processing is then performed (step S99). In addition, the micro-processor 426 starts to execute a single jump (step S100). In this case, a single jump means a control operation of returning the reproduction point of a light beam to the previous track separated from the current position by one track. Since it takes about 300 μsec to execute a single jump once, the single jump processing cannot be completed within one interruption processing operation. For this reason, a single jump is divided and executed in several interruption processing operations. In this case, part of the single jump processing is executed, and the single jump processing ends (step S101). Thereafter, the micro-processor 426 checks whether the single jump is completed. In this case, since the single jump is not completed yet, NO is determined by the micro-processor 426, and the flow returns from the wait jump processing to step S88 in FIG. 31. The interruption processing by the micro-processor 426 then ends (step S89).

Assume that the processing proceeds, and the counter value becomes 833 after one is added thereto (point e in FIGS. 30A through 30C). The micro-processor 426 starts wait jump processing and checks the value of the jump flag (step S92). In this case, since the jump flag is one, the flow advances from step S92 to step S99 in FIG. 32, and a single jump is executed (step S100). The last part of the single jump processing is performed, and the single jump processing ends (step S104). By performing a single jump, control is performed to return the reproduction point of a light beam by a distance corresponding to one track. The micro-processor 426 then sets the jump flag to be 0 (step S102), sets the value of the counter based on generation of pulses to be 0 (step S103), executes a return instruction (step S104), and completes all the wait jump processing at time e in FIG. 30.

With the above processing, a wait jump is executed. In this embodiment, the rotational period of a disc is set to be a value which is not divisible by the interruption period. However, since the jump timing is based on the 31st pulse, no jump timing error occurs. For the above reason, the counter value at the end of a Wait jump is not necessarily 833 but may be less than 833.

With the above arrangement and operation, in the disc apparatus for performing system processing by using one micro-processor 426 and performing servo processing by interruption processing performed by the same micro-processor 426, a wait jump can be performed at an accurate timing. Therefore, a low-cost, compact information recording/reproducing apparatus can be provided.

In addition, since an output from the disc rotation detecting means need not be monitored every time servo processing is started, one interruption processing operation can be performed within a short period of time. Therefore, the cost of the disc apparatus can be reduced by using an inexpensive micro-processor instead of an expensive, high-speed micro-processor.

Furthermore, since time measurement is performed by counting the number of times that interruption processing, which is started at a predetermined period, is executed, a wait jump can be accurately executed even if servo processing as interruption processing is executed. Therefore, there is no need to use a counter circuit for counting one revolution of a disc, leading to a further reduction in cost.

[Seventh Embodiment]

The seventh embodiment will be described below with reference to FIG. 33. Note that the same reference numerals in FIG. 33 denote the same parts as in FIG. 27, and a description thereof will be omitted.

Figure 33:
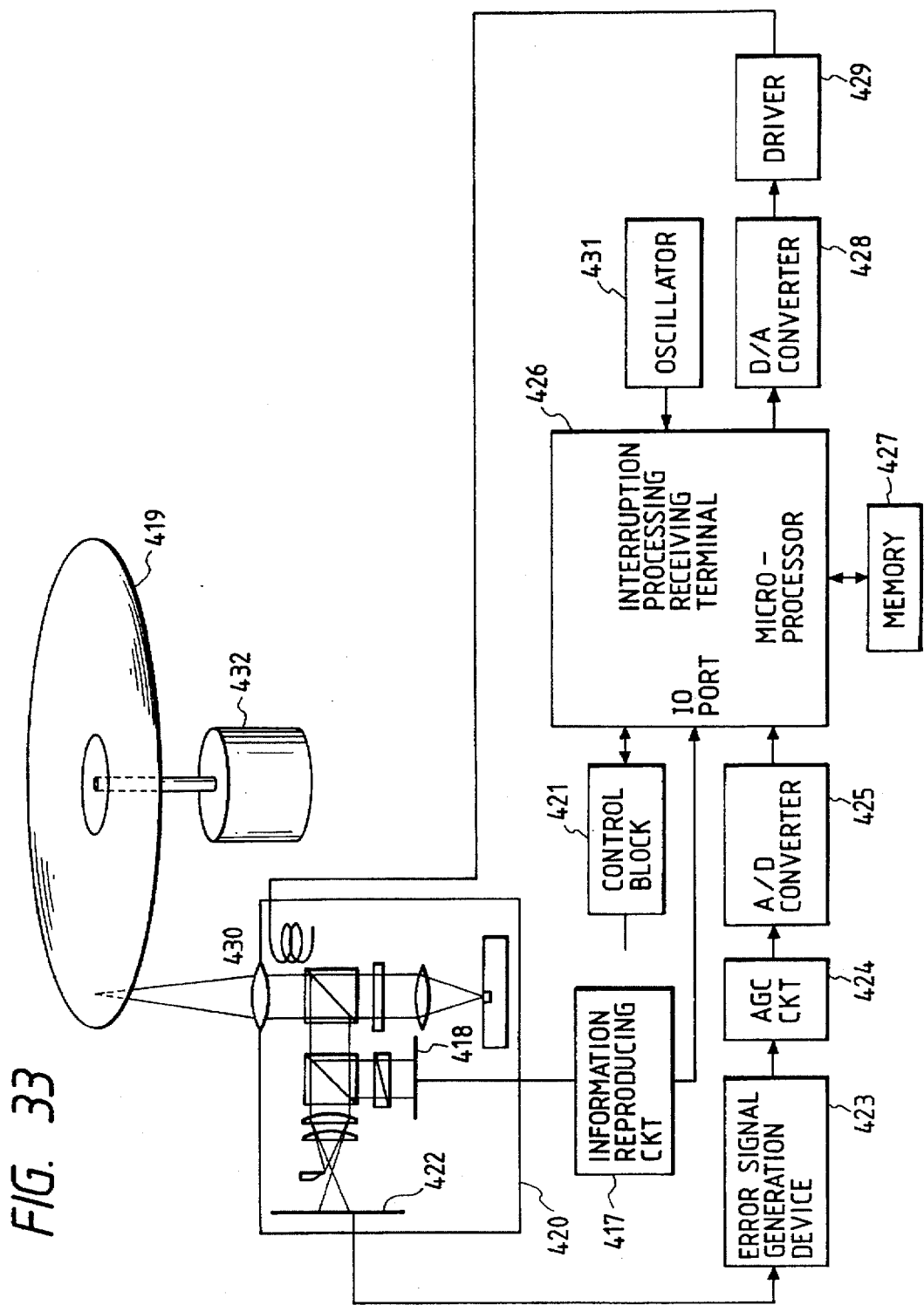
FIG. 33 is a block diagram showing the arrangement of the seventh embodiment.

Referring to FIG. 33, a magnetooptical disc apparatus of this embodiment includes a control block 421. The control block 421 has functions of communicating with a host computer arranged outside the system, temporarily storing data in a memory at the time of communication, performing abnormal processing in the occurrence of a system abnormality, and correcting errors in information. A servo sensor 422 generates a signal required for generation of position error information about the optical head by using light reflected by a magnetooptical disc. An information reproduction sensor 418 reads information recorded on the disc. An error signal generation device 423 generates error signals such as a focusing error signal and a tracking error signal. An AGC circuit 424 eliminates variations in the amplitude level of an error signal caused by variations in light amount. An A/D converter 425 converts an error signal into a digital value.

A micro-processor 426 controls the control block 421 and performs digital servo arithmetic processing. The micro-processor 426 has an interruption processing receiving terminal. Upon reception of an interruption start signal at the interruption processing receiving terminal, the micro-processor 426 interrupts the processing which has been executed, and starts execution of a program written in an interruption processing program region. Upon completion of the interruption processing, the micro-processor 426 resumes the program which has been executed before the interruption processing was started. In this case, the micro-processor 426 resumes the program from an instruction next to the instruction which has been executed before the processing was interrupted. A memory 427 serves to store programs for operating the micro-processor 426. A D/A converter 428 converts an output calculated by the micro-processor 426 into an analog signal. A driver 429 supplies a current to its output terminal in accordance with the input signal from the D/A converter 428. An actuator 430 drives an objective lens in an optical system 420 in accordance with the current supplied from the driver 429. An output from an oscillator 431 is input, as an interruption processing start signal, to the micro-processor 426.

This disc apparatus includes a disc rotating mechanism 432. An information reproducing circuit 417 reproduces information recorded on a disc. The information reproducing circuit 417 includes a preformat portion detecting means. An output from the preformat portion detecting means is set at low level in a normal operation, and at high level when the reproduction point of a light beam reproduces a preformat portion. The output terminal of the preformat portion detecting means is connected to the I/O port of the micro-processor 426.

Software for operating the micro-processor 426 is stored in the memory 427. As shown in FIG. 28, associated with the sixth embodiment, the software is divided into an ordinary program region 401 and an interruption processing program region 403. In the ordinary program region 401, system control software 402 is written. In the interruption processing program region 403, servo processing 404 is written.

The operation and function of the seventh embodiment having the above arrangement will be described below. In this embodiment, in performing a wait jump, preformat portions set on a disc 419 are used. A preformat portion is formed at the beginning of each sector of the disc. Address information of a sector and the like are recorded on each preformat portion. If, therefore, jump processing is always performed at a predetermined preformat portion to return the reproduction of a light beam by a distance corresponding to one track, the reproduction of a beam spot can be set in a standby state on the same track on which the corresponding sector is present. The number of preformat portions per revolution of a disc varies depending on the type of disc format. In some cases, the number of preformat portions per revolution of a disc varies, even within the same disc, depending on the track positions, i.e., inner and outer peripheral track positions. Assume, in this case, that a disc having 25 preformat portions per revolution is used.

A wait jump can be performed regardless of the type of disc by using this embodiment and the arrangement in which a jump is always performed at the same preformat portion.

Figure 34:
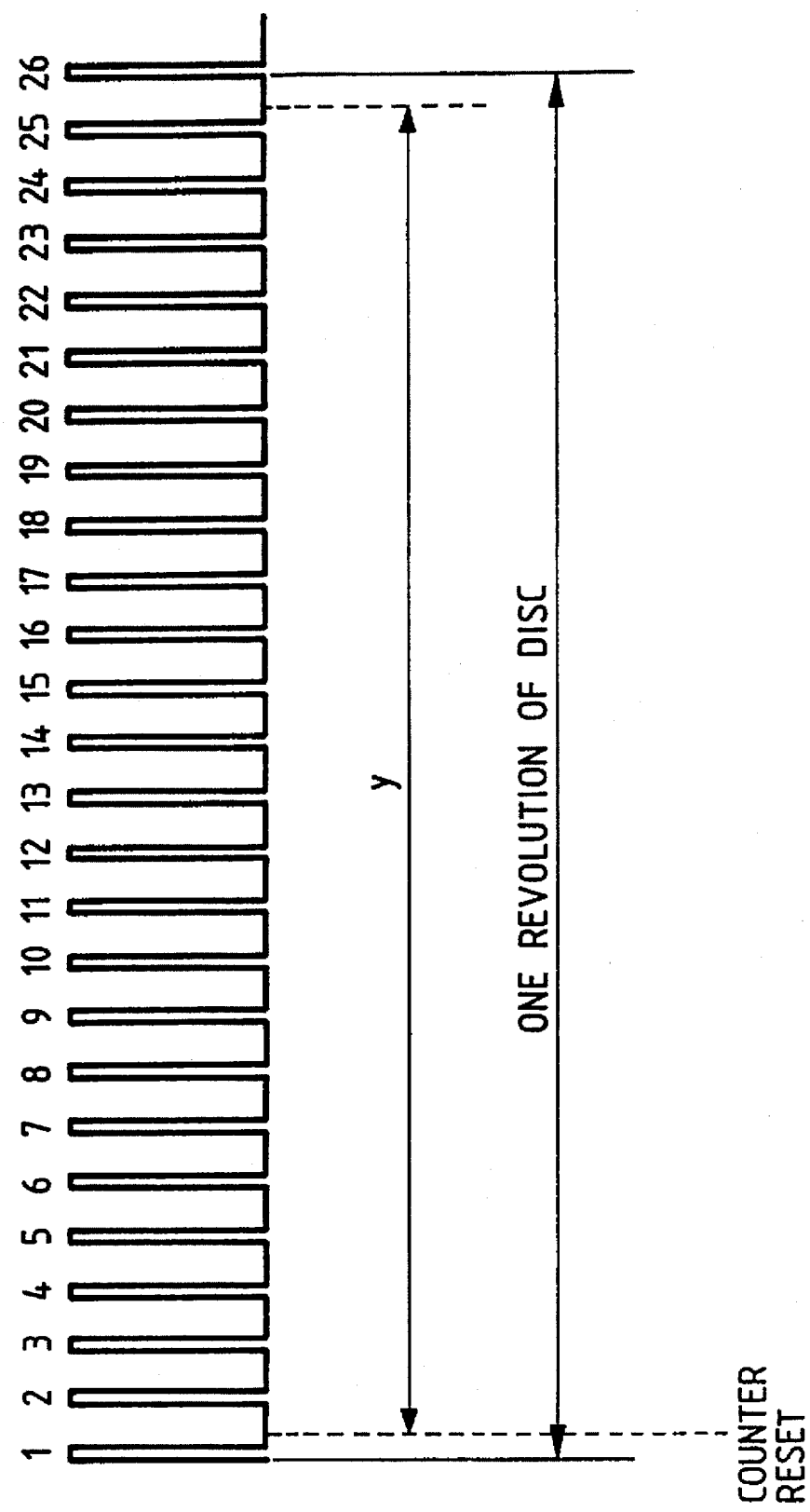
FIG. 34 is a timing chart showing the waveform of an output from a preformat portion detecting means during one revolution of a disc to explain the operation of the seventh embodiment.

In this embodiment, the lapse of a predetermined period of time is determined by the same method as described in the sixth embodiment, and a wait jump is performed when a pulse is generated at the output terminal of the preformat portion detecting means. As shown in FIG. 34, the preformat portion detecting means outputs 25 pulses while a disc is rotated once. In order to detect a time shorter than the time taken for one revolution of the disc, the preformat portion detecting means must detect a timing immediately before the 26th pulse is generated by the preformat portion detecting means. If the lapse of the predetermined period of time is determined before the 25th pulse is generated by the preformat portion detecting means, a wait jump is performed in response to a pulse generated before the 26th pulse is generated. As a result, wait jumps cannot be performed at a proper period. Therefore, in this embodiment, the time interval between the instant at which the 25th pulse is generated and the instant before the 26th pulse is generated, i.e., the time interval corresponding to a time interval y in FIG. 34, must be detected.

Assume that the number of revolutions of a disc per minute is 3,600 rpm, and the interruption period is 20 μsec. In this disc apparatus, the number of times that interruption processing is performed per revolution of the disc is 833.3. Therefore, in order to measure the time interval between the instant at which the counter is reset and the instant before the 26th pulse is generated, a value to be compared with the counter value must be a value smaller than 833. If time measurement is completed before the preformat portion detecting means starts to generate the 25th pulse, a wait jump is performed in response to a pulse generated before the 26th pulse. As a result, wait jumps cannot be performed at a proper period.

The time required for the preformat portion detecting means to generate 24 pulses corresponds to the time required to perform interruption 800 times. Therefore, a numerical value to be compared with the counter value must be 801 or more. In addition, a consideration must also be given to the time interval between the instant at which comparison with the counter value is performed and the instant at which wait jump processing is completed, i.e., the counter value is reset. Furthermore, a processing time of about 300 μsec required to perform wait jump processing. In this case, similar to the sixth embodiment, the numerical value to be compared is set to be 816. With this setting, the disc apparatus of this embodiment detects a time shorter than the time taken for one revolution of the disc by about 340 μsec. On the other hand, since the period at which the preformat portion detecting means generates pulses is 666.7 μsec, it is apparent that the time 340 μsec is sufficiently short as compared with the period at which the preformat portion detecting means generates pulses. For this reason, in this disc apparatus, there is no possibility that a wait jump is performed at a period less than the time taken for one revolution of the disc.

Figure 36:
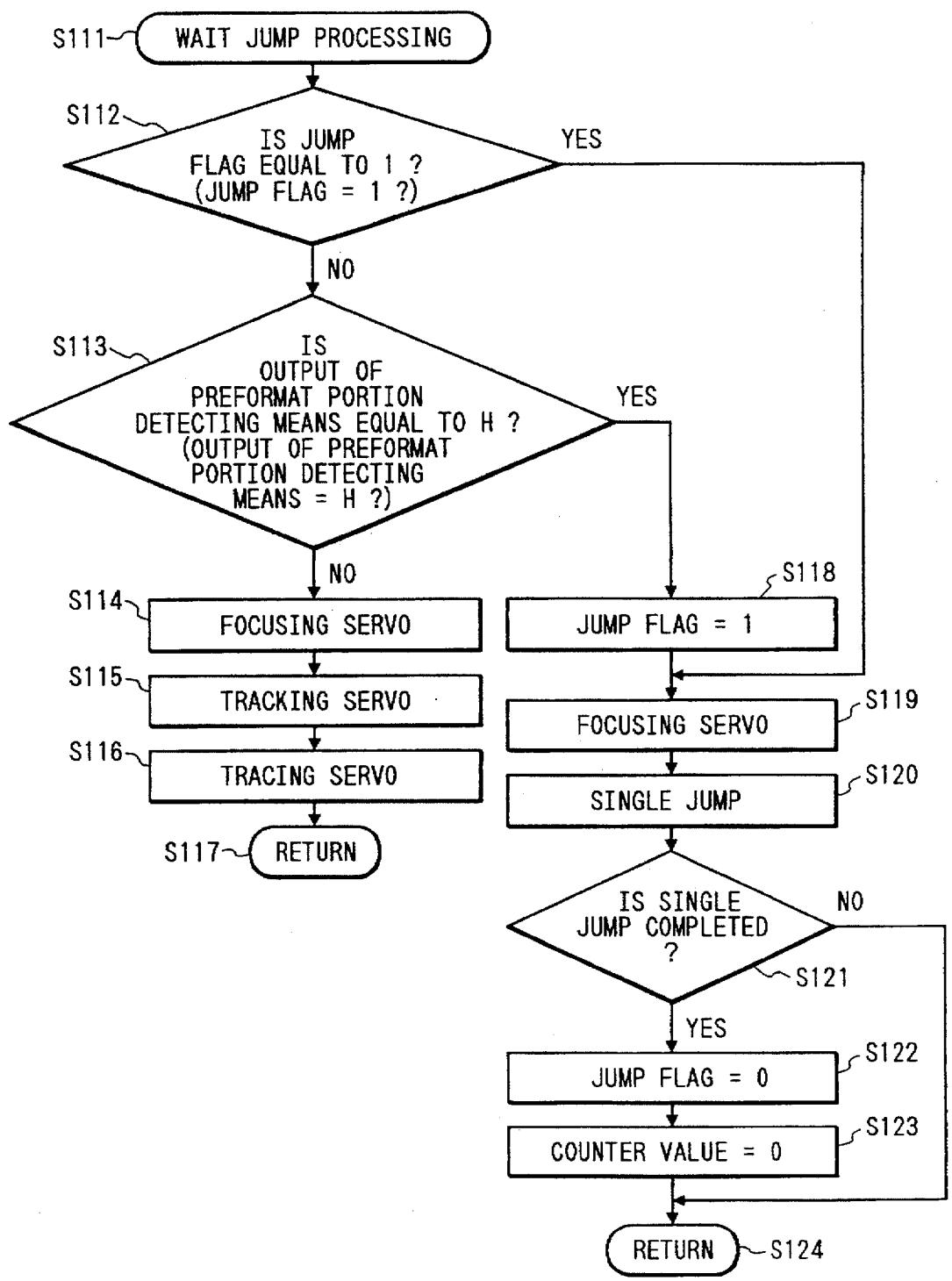
FIG. 36 is a flow chart showing a wait jump routine in the seventh embodiment.

Processing performed in the seventh embodiment will be described next with reference to FIGS. 31 and 36. In the seventh embodiment, a portion for counting a predetermined period of time is the same as that in the sixth embodiment. In the sixth embodiment, however, after the predetermined period of time is detected, a change in an output from the pulse generating means to high level is detected in the wait jump routine. In the seventh embodiment, a change in an output from the preformat portion detecting means to high level is detected instead.

Figure 35:
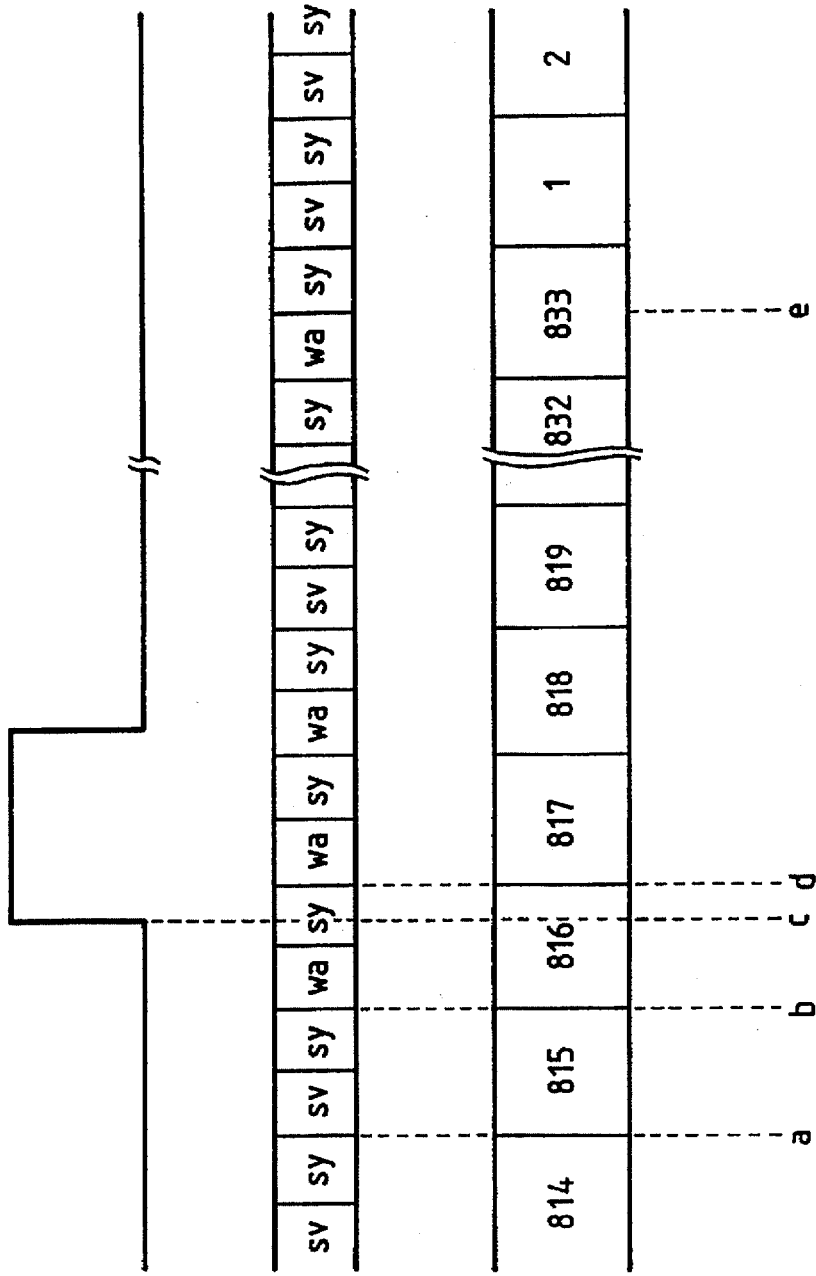
FIGS. 35A through 35C are timing charts for explaining a wait jump timing in the seventh embodiment.

The contents of wait jump processing will be described below. Assume that the micro-processor 426 receives an interruption processing start signal at the interruption processing receiving terminal at time a in FIGS. 35A through 35C. In this case, the micro-processor 426 starts a program written in the interruption processing program region.

Interruption processing will be described below with reference to the flow chart in FIG. 31. The micro-processor 426 starts to execute servo processing (step S81). The micro-processor 426 adds one to the counter value (step S82). The interruption processing count value in FIG. 35 indicates the counter value at this time. Assume that the counter value at this point is 815. It is then checked whether the counter value exceeds a predetermined value (816 in this case) (step S83). As a result of this decision step, the micro-processor 426 performs focusing servo processing (step S84), tracking servo processing (step S85), and tracing servo processing (step S86), and completes the interruption processing (step S87). With the above processing, when the counter value is smaller than the predetermined value, a wait jump is not performed, and the reproduction point of a light beam traces a track.

Wait jump processing (step S88) in the seventh embodiment to be performed after this disc apparatus counts the predetermined time (816 in this case) will be described next with reference to FIG. 36. The micro-processor 426 starts to execute the second wait jump subroutine shown in FIG. 36 (step S111). First of all, the micro-processor 426 checks the value of a jump flag (step S112). The initial value of the jump flag is 0. Therefore, the value of the jump flag is also 0 at this time. When the jump flag is 0, the micro-processor 426 monitors an output from the preformat portion detecting means (step S113). Assume that the output from the preformat portion detecting means is at low level at this time. The micro-processor 426 then performs focusing servo processing (step S114), tracking servo processing (step S115), and tracing servo processing (step S116), and executes a return instruction (step S117), thereby completing the interruption processing (step S89).

In this interruption processing, a wait jump is not performed, and the reproduction point of a light beam traces a track. Thereafter, the micro-processor 426 resumes system processing.

Assume that the current time is at a point c in FIG. 35A and through 35C, and the output from the preformat portion detecting means changes from low level to high level. In this case, the micro-processor 426 starts interruption processing again in response to the next interruption start signal (step S81), and sets the counter value to be 817 (steps S82 and S83), thereby starting to execute wait jump processing (step S88). The micro-processor 426 checks the value of the jump flag (step S112). In this case as well, the jump flag is 0. Therefore, the micro-processor 426 monitors an output from the preformat portion detecting means (step S113). At this time, an output from the preformat portion detecting means is at high level. The micro-processor 426 changes the value of the jump flag to one (step S118). The micro-processor 426 then performs focusing servo processing (step S119). In addition, the micro-processor 426 starts to execute a single jump (step S120). A single jump is a control operation of returning the reproduction point of a light beam by a distance corresponding to one track. A single jump is divided and executed in several interruption processing operations. In this case, part of the single jump processing is executed, and the single jump processing ends. At this time, the micro-processor 426 checks whether the single jump is completed (step S121). In this case, since the single jump is not completed yet, the flow advances to step S124 to return from the wait jump processing to the servo processing (step S89). The micro-processor 426 then completes the interruption processing.

Assume that the processing further proceeds, and the counter value becomes 833 upon addition of one. The micro-processor 426 performs the same processing as described above. Since the jump flag is set to be one (step S112), even if an output from the preformat portion detecting means is at low level, the micro-processor 426 starts to execute a single jump (step S120). In this case, the last part of the single jump is performed, and the single jump processing is completed (step S121). When a single jump is performed, control is performed to return the reproduction point of a light beam by a distance corresponding to one track. The micro-processor 426 clears the jump flag to 0 (step S122), and sets the counter value to be 0 (step S123). The micro-processor 426 then executes a return instruction (step S124) and completes the wait jump processing at time e in FIGS. 35A through 35C.

With the above processing, a wait jump is completed. Similar to the sixth embodiment, in the seventh embodiment, the rotation period of a disc is set to be a value which is not divisible by the interruption period. However, since the jump timing is set on the basis of the 26th pulse output from the preformat portion detecting means, no jump timing error occurs.

In the above embodiment, 25 preformat portions are present per revolution of a disc. Even if, however, the numbers of preformat portions on tracks on the inner and outer peripheral portions of a disc differ from each other, since a single jump is executed when it is determined in step S83 in FIG. 31 that the counter value exceeds the numerical value to be compared and when it is determined in step S113 in FIG. 36 that an output from the preformat portion detecting means is at high level, a wait jump can be accurately performed in accordance with the flow charts shown in FIGS. 31 and 36.

With the above arrangement and operation, according to this embodiment, the same effects as those of the sixth embodiment can be obtained by using generation of pulses from the preformat portion detecting means. In addition, since no rotation detecting mechanism is required, a more inexpensive, compact information recording/reproducing apparatus can be provided.

Although a magnetooptical disc apparatus is employed to discuss the embodiments of the present invention, the present invention can be applied to other optical disc apparatus for a CD, CD-ROM or the like.

What is claimed is:

1. A magnetooptical disc apparatus for recording and/or reproducing information on/from a magnetooptical recording medium by irradiating a desired track of the recording medium with a light beam emitted from a light source via an optical system, said apparatus comprising:

calculation means for controlling input/output processing of the information with respect to said disc apparatus and for performing servo control of the light beam by causing interruption in the input/output processing control, wherein said calculation means generates the interruption at a predetermined period.

2. An apparatus according to claim 1, wherein the servo control includes tracking servo control and focusing servo control.

3. An apparatus according to claim 1, further comprising:

means for detecting a tracking error signal or a focusing error signal for the light beam;

means for converting the detected tracking or focusing error signal into digital signals at a predetermined period, wherein said calculation means calculates control amounts of the light beam on the basis of the tracking or focusing error signal converted into the digital signals and outputs calculated values;

means for converting the calculated values into analog signals; and tracking or focusing actuators for moving the light beam on the basis of the calculated values converted into the analog signals, wherein the start time of the interruption is different in timing from the start time of the analog/digital conversion.

4. An apparatus according to claim 1, wherein said calculation means sets a parameter in the servo control and a parameter in signal processing of the information when said disc apparatus is turned on, sets the parameter for the servo control on the basis of a reproduction signal amplitude of the information with a change in state of the servo control, and sets the parameter for the signal processing of the information in accordance with a reproduction signal amplitude of the information corresponding to the set parameter for the servo control.

5. An apparatus according to claim 1, wherein said calculation means comprises a plurality of internal and external memory means, the calculation values for the servo control being stored in said internal memory means.

6. An apparatus according to claim 1, further comprising:

detection means for detecting reflected light of the light beam from the recording medium;

means for generating tracking and focusing error signals for the light beam on the basis of a detection result obtained by said detection means;

means for generating a sum total signal for the light beam on the basis of the detection result obtained by said detection means;

means for normalizing the tracking and focusing error signals by dividing the tracking and focusing error signals by the sum total signal, wherein said calculation means calculates control amounts of the light beam on the basis of the normalized tracking and focusing error signals, and outputs calculated values; and tracking and focusing actuators for moving the light beam on the basis of the calculated values converted into the analog signals.

7. An apparatus according to claim 1, further comprising:

means for causing the light beam to jump in a direction to cross the track while performing said servo control;

rotating means for rotating the recording medium;

pulse generating means for generating predetermined pulses while the recording medium is rotated once by said rotating means; and time measurement means for measuring time, wherein, in wait jump processing, a jump is performed if said time measurement means detects a change in an output from said pulse generating means after a lapse of a predetermined period of time since a previous jump was performed.

8. An apparatus according to claim 1, further comprising:

means for causing the light beam to jump in a direction to cross the track while performing the servo control;

rotating means for rotating the recording medium;

preformat portion detecting means for detecting the presence of the light beam on a preformat portion on the recording medium; and time measurement means for measuring time, wherein, in wait jump processing, a jump is performed if said time measurement means detects a chance in an output from said preformat portion detecting means after a lapse of a predetermined period of time since a previous jump was performed.

* * * * *

UNITED STATES PATENT AND TRADEMARK OFFICE
CERTIFICATE OF CORRECTION

PATENT NO. : 5,699,330                                  Page 1 of 2
DATED      : December 16, 1997
INVENTOR(S): TSUKASA OGINO, ET AL.

It is certified that error appears in the above-identified patent and that said Letters Patent is hereby corrected as shown below:

COLUMN 12:

Line 23, "to" should read --of--.

COLUMN 24:

Line 55, "intervals," should read --interval,--.

COLUMN 25:

Line 34, "(Wa)" should read --(wa)--.

COLUMN 26:

Line 40, "Wait" should read --wait--.

COLUMN 28:

Line 53, "required" should read --is required--.

COLUMN 29:

Line 52, "FIG. 35A" should read --FIGS. 35A--; and
    Line 53, "and" (first occurrence) should be deleted.

UNITED STATES PATENT AND TRADEMARK OFFICE
CERTIFICATE OF CORRECTION

PATENT NO. : 5,699,330

DATED : December 16, 1997

INVENTOR(S) : TSUKASA OGINO, ET AL.

It is certified that error appears in the above-identified patent and that said Letters Patent is hereby corrected as shown below:

COLUMN 32:

Line 39, "chance" should read --change--.

Signed and Sealed this

Second Day of June, 1998

Attest:

BRUCE LEHMAN

Attesting Officer

Commissioner of Patents and Trademarks